(12) United States Patent
Kikuchi et al.

(10) Patent No.: US 11,269,315 B2
(45) Date of Patent: Mar. 8, 2022

(54) DISTRIBUTED CONTROL SYSTEM

(71) Applicants: Toyota Jidosha Kabushiki Kaisha, Toyota (JP); Toyota School Foundation, Nagoya (JP)

(72) Inventors: Satoshi Kikuchi, Susono (JP); Michihiro Kawanishi, Nagoya (JP); Tatsuo Narikiyo, Nagoya (JP); Ngoc Huynh Tran, Nagoya (JP)

(73) Assignees: TOYOTA JIDOSHA KABUSHIKI KAISHA, Toyota (JP); Toyota School Foundation, Nagoya (JP)

(*) Notice: Subject to any disclaimer, the term of this patent is extended or adjusted under 35 U.S.C. 154(b) by 0 days.

(21) Appl. No.: 16/901,360

(22) Filed: Jun. 15, 2020

(65) Prior Publication Data
US 2020/0409341 A1 Dec. 31, 2020

(30) Foreign Application Priority Data
Jun. 26, 2019 (JP) .............................. JP2019-119170

(51) Int. Cl.
G05B 19/418 (2006.01)
(52) U.S. Cl.
CPC ..... G05B 19/4185 (2013.01); G05B 19/4183 (2013.01); G05B 19/41865 (2013.01)
(58) Field of Classification Search
CPC ............ G05B 19/4185; G05B 19/4183; G05B 19/41865; G05B 19/0421; G05B 19/41845; G05B 2219/33273
See application file for complete search history.

(56) References Cited

U.S. PATENT DOCUMENTS

| | | | |
|---|---|---|---|
| 2002/0178395 A1* | 11/2002 | Chen | H04M 15/00 714/2 |
| 2011/0077773 A1 | 3/2011 | Yu et al. | |
| 2016/0117505 A1 | 4/2016 | Chow et al. | |
| 2016/0276830 A1* | 9/2016 | Nasirian | H04W 4/50 |

FOREIGN PATENT DOCUMENTS

| | | |
|---|---|---|
| JP | 2009-159808 A | 7/2009 |
| JP | 2010-146246 A | 7/2010 |
| JP | 2016-099955 A | 5/2016 |

OTHER PUBLICATIONS

Gulzar, M.M.; Rizvi, S.T.H.; Javed, M.Y.; Munir, U.; Asif, H. Multi-Agent Cooperative Control Consensus: A Comparative Review. Electronics 2018, 7, 22 (Year: 2018).*

(Continued)

*Primary Examiner* — Christopher E. Everett
(74) *Attorney, Agent, or Firm* — Dinsmore & Shohl LLP

(57) ABSTRACT

A distributed control system includes a plurality of control units that controls respective units of a plurality of devices, and a communication network that includes a communication line that connects the control units. A control unit of each of the devices is configured to determine a state target value, according to consensus control of a multi-agent system, by using a current state index value of a self-device, and a difference between a latest state index value of an adjacent device received from a control unit of the adjacent device, and a latest state index value of the self-device received from the control unit of the adjacent device.

11 Claims, 7 Drawing Sheets

(56) References Cited

OTHER PUBLICATIONS

Li, Zhenhong et al., "Fully distributed adaptive consensus control of multi-agent systems with LQR performance index", 2015 IEEE 54th Annual Conference on Decision and Control (CDC), IEEE, Dec. 15, 2015, p. 386-391.
U.S. Appl. No. 16/909,240, filed Jun. 23, 2020; Inventors: Satoshi Kikuchi et al.
Azuma, et al., "Control of Multi-agent System", System Control Engineering Series 22, Corona Publishing Co., Ltd. p. 80-111, Sep. 18, 2015. (The concise explanation of relevance is contained in the specification at page 2).
Sakurama, et al., "Average-consensus Problem of Multi-agent Systems with Non-uniform and Asymmetric Time-delays", Transactions of the Society of Instrument and Control Engineers, vol. 47, No. 2, p. 100-109, 2011. (The concise explanation of relevance is contained in the specification at page 2).
Wu, et al., "Average Consensus in Multi-Agent Systems with Non-uniform Time-Varying Delays and Random Packet Losses", 3rd IFAC International Conference on Intelligent Control and Automation Science. Sep. 2-4, 2013, Chengdu, China, p. 321-326. (Cited in the specification at page 3).

\* cited by examiner

DISTRIBUTED CONTROL SYSTEM

CROSS-REFERENCE TO RELATED APPLICATIONS

This application claims priority to Japanese Patent Application No. 2019-119170 filed on Jun. 26, 2019, which is incorporated by reference in its entirety including the specification, drawings and abstract.

BACKGROUND

1. Technical Field

The disclosure relates to a distributed control system configured such that control units for a plurality of devices are connected to each other via a network, and a state of a self-device is controlled, based on the state of the self-device and the states of other devices. More specifically, the disclosure relates to a multi-agent system constituted by control units for a plurality of devices, in which the state of each device is controlled according to consensus control of the multi-agent system.

2. Description of Related Art

With the development of the communication network technology, technologies for connecting a plurality of devices, in particular, devices located at positions spaced apart from each other, to a network system, and comprehensively or remotely controlling and managing operation and states of the devices, via the network system, have been proposed and realized. As one type of control and management systems for the devices, using the communication network technology, a distributed control system is used in which the devices connected via the network mutually monitor their operating states, and each of the devices autonomously performs control and management of its states. As a control protocol according to which operating states of each device are controlled in the distributed control system, a protocol or algorithm of control of "multi-agent system" in which each device in the system is controlled by a distributed controller is known, and various configurations have been proposed in connection with this system.

For example, as proposed in Japanese Unexamined Patent Application Publication No. 2010-146246 (JP 2010-146246 A), when two or more multi-agent systems are constructed and operate independently of each other, in one system, one terminal computer is configured such that the function of communication between its agents can be shared in the multi-agent systems. In a system proposed in Japanese Unexamined Patent Application Publication No. 2009-159808 (JP 2009-159808 A) using a multi-agent technology, for use in a distribution type electric power system including a plurality of generators and loads, a section agent located for each section separated by a section switch of the power system grasps the flow amount in the section, and asks generator agents or agents in a downstream section to adjust the amount of increase or decrease of the flow amount, and each of the generator agents and downstream-section agents autonomously performs adjustment with other generator agents and downstream-section agents, in a repeated manner, so as to perform demand and supply control of distributed power sources in the section and the downstream section. In a power management system that constitutes a multi-agent system as proposed in Japanese Unexamined Patent Application Publication No. 2016-099955 (JP 2016-099955 A), in order to improve the confidentiality of data concerning each user while coping with increase of the number of users sharing statistics, an information processing device of each user specifies destinations to which division value data indicating a division value are transmitted, based on the maximum amount of power and its division value, and sends the division value data, and another information processing device that receives the division value data calculates the average value or standard deviation of the amount of power managed by two or more power management devices. Further, it is proposed in System Control Engineering Series 22 "Control of Multi-agent System" Shun-ichi AZUMA, and five others, Corona Publishing Co., Ltd. Sep. 18, 2015 that a control method of a multi-agent system is an effective method, in control of states of agents, such as power sources or energy sources in a distribution type energy management system. In "Average-consensus Problem of Multi-agent Systems with Non-uniform and Asymmetric Time-delays" Kazunori SAKURAMA, and another person, Transactions of the Society of Instrument and Control Engineers Vol. 47, No. 2, 100/109 (2011), conditions under which a consensus value is obtained in an average-consensus problem of a multi-agent system in the case where there are non-uniform and asymmetric time-delays in information transmission in a network are analyzed and considered. In "Average Consensus in Multi-Agent Systems with Non-uniform Time-Varying Delays and Random Packet Losses" Wu and four others (Jian Wu, Yang Shi, Bingxian Mu, Huxiong Li, and Wenbai Li) 3rd IFAC International Conference on Intelligent Control and Automation Science, Sep. 2-4, 2013. Chengdu, China, p. 322-326, which is concerned with an average consensus problem of multi-agent systems, a method of converging state values of all agents to a consensus value as the average of the initial values of respective agents, when time delays that arise in information transmission between agents in a network are symmetrical, is proposed.

SUMMARY

According to consensus control of a multi-agent system on states of a plurality of devices connected to a communication network in a distributed control system, a state index value $x_i$ representing a state of a given device, or agent i, is controlled according to the following equations.

$$x_i[k+1] = x_i[k] + T_s \cdot u_i[k] \quad (1)$$

$$u_i[k] = \sum_{j \in N_i}^{n} a_{ij}(x_j[k] - x_i[k]) \quad (1a)$$

$$a_{ij} = \begin{cases} \dfrac{1}{1 + \max(|N_i|, |N_j|)} & : j \in N_i \\ 0 & : j \notin N_i \end{cases} \quad (1b)$$

In the above equations, $x_i[k]$ is a state index value of the agent i at time k, $x_i[k+1]$ is a target value which the state index value should take upon a lapse of one sampling time from time k, $x_j[k]$ is a state index value of an agent j directly connected to the agent i via a communication network, at time k, $N_i$, $N_j$ is a set of agents directly connected to the agent i, j, respectively, and $|N_i|$, $|N_j|$ is the number (order) of $N_i$, $N_j$, respectively, and $T_s$ is a sampling period. Also, the second term on the right side of Eq. (1) is called "distributed controller". While the above equation is applied in the case of a discrete time system, a differential equation into which the difference equation of state $x_i$ is rewritten is used in the case of a continuous-time system. Then, when the state of each agent is controlled according to the above equation, where the system is in the form of an undirected graph to which all agents are connected, the state index values $x_i$ of the respective agents theoretically converge to a consensus value as the average of the initial values $x_i[0]$ of the state index values $x_i$ of the respective agents (average consensus control), as will be described below.

$$x^* = \sum_{i=1}^{n} \frac{x_i[0]}{n} \qquad (2)$$

As known in the this technical field, the "consensus control of the multi-agent system" is control of a type in which the state of each agent is controlled so that the state index values of all agents (i.e., devices) in the system asymptotically become equal to a certain consensus value. Namely, the state of each agent is controlled so that $$\lim_{k \to \infty} (x_i[k] - x_j[k]) = 0 \qquad (3)$$

is satisfied with respect to the state index values $x_i$, $x_j$ of any agent i and agent j in the system, and the state index value $x_i$ of any agent i converges to a certain constant value $\alpha$. Namely, under the consensus control, the state of each agent is controlled so that $$\lim_{k \to \infty} x_i[k] = \alpha \qquad (4)$$

is satisfied.

As described above with regard to the consensus control of the multi-agent system, it has been found from previous studies that, when the state of each agent is controlled by using the difference equation of Eq. (1) above generally known as one achieving consensus control, as it is, the state index values of all agents converge to a certain constant consensus value $\alpha$ (Eq. (3) and Eq. (4) are satisfied), theoretically in the case where each agent can refer to state index values of adjacent agents in real time, namely, in the case where there are no time-delays in transmission of the state index values from the adjacent agents to each agent via communication lines. In the case where a significant time is required to transmit state index values between each pair of agents via the communication line (where time-delays are generated), the state index values of the agents may not converge to the consensus value, or may converge to it but the consensus value may vary. Accordingly, in the distributed control system using the actual communication network in which time-delays arise in transmission of the state index values via the communication lines, appropriate consensus control may not be achieved if the equation of Eq. (1) is used as it is. To cope with this situation, the inventors of this disclosure proposed an arrangement for compensating for influences due to communication delays of signals in the communication network, in the case where the time delays are symmetrical.

Then, the inventors of this disclosure further searched for a control protocol according to which the consensus control can be appropriately achieved, even when the time-delays in signal transmissions are not symmetrical. As mentioned above, it became apparent that, if the latest state index value transmitted from an adjacent agent is used as the state index value of the adjacent agent referred to in determination of the amount of change per cycle in the state target value of each agent (computation in the distributed controller), and the latest state index value received by the adjacent agent is used as the state index value of each agent, the average of the state index values of all agents is conserved, and the expected consensus value can be achieved when the state index values of all agents converge to it. In the case of the average consensus control, in particular, the consensus value is stably held at the average of the initial values of the state index values of the respective agents.

Regarding the average consensus control of the multi-agent system, convergence of the state index values $x_i$ of the agents in computation according to Eq. (1) above to the average of their initial values $x_i[0]$ is stably achieved, on the assumption that there is simultaneity between the agents (a condition where there are no time-delays in signal information transmission in the communication network between the agents, and each agent can instantly refer to the state index value of the adjacent agent in real time). However, when the condition of the simultaneity between the agents is not satisfied, namely, when there are time-delays in signal information transmission of the communication network between the agents, the average of the state index values x of all agents is not held at the average of their initial values $x_i[0]$, and it would be difficult to control the state index values $x_i$ of all agents to the average of their initial values $x_i[0]$. In fact, even if the state index values $x_i$ of all agents converge to the consensus value, the consensus value may deviate from the average (i.e., the value of Eq. (2)) of the initial values $x_i[0]$ of all agents. It is also found that, when there are time-delays in signal information transmission of the communication network between the agents, the convergence performance of the state index values $x_i$ of all agents to the consensus value may be deteriorated.

In the meantime, in the communication network used in the actual distributed control system, delays in signal information transmission due to some factors are inevitably generated. The delays include, for example, application delays on the order of microseconds (e.g., a delay generated when the sending side passes a packet to a TCP/IP layer, a delay generated when the receiving side receives a packet, processes it, and send back a response), serialization delays on the order of microseconds to milliseconds (the time it takes from when the first bit of a packet is transmitted, to when the last bit is transmitted, which time increases as the bandwidth of the network is narrower), propagation delays (i.e., a delay generated when a signal propagates through a medium of a cable), congestion delays (the time required to store any packet exceeding the bandwidth of a line, in a buffer, and re-transmit the packet), and so forth. In particular, in a large-scale network to which a great number of agents are connected, the traffic of signals is congested, and communication delays are generated, for reasons, such as signal transmission delays in communication cables, transmission delays in routers or hubs, collision due to concentration of communications, and transmission delays during multi-hop communications. Accordingly, the control protocol using Eq. (1) needs to be improved, so as to achieve expected control of the state of each agent under the average consensus control of the multi-agent system in the actual distributed control system.

In this respect, the inventors of this disclosure already proposed a system configured as follows: in control of a state in each agent, when a distributed controller calculates an amount of change of a state index value of its own agent (self-agent), i.e., control input ($u_i$ of Eq. (1)), by referring to the state index value of an adjacent agent, it uses not all of the state index values sampled in time series in the adjacent agent, but intermittently refers to the state index values of the adjacent agent. As a result, it is possible to compensate for deterioration of the convergence performance of the state index values to the consensus value due to time-delays in signal information transmission of the communication network between the agents. Also, in the control input of the distributed controller, the state index value having the same sampling time as the referred state index value of the adjacent agent is used, as the state index value of the self-agent, so that the consensus value to which the state index values of the agents converge can be made equal to the average of the initial values $x_i[0]$ of all agents, as expected. Thus, the proposed system can assure convergence of the state index values to the consensus value and accuracy. However, in this configuration, it is assumed that time-delays in communications in both directions between any two agents are equal (namely, the time-delays are symmetrical). Thus, the inventors of this disclosure further proceeded with research and development, and gained a finding as follows. In the control input of the distributed controller of each agent, a difference between the latest state index value of an adjacent agent received from the adjacent agent (the latest value of the state index value measured at the adjacent agent when it is transmitted from the adjacent agent to the self-agent), and the latest state index value of the self-agent received by the adjacent agent (or confirmed to be received by the adjacent agent) (the latest value of the state index value measured at the self-agent at the time when it is transmitted from the self-agent to the adjacent agent) is used. As a result, even when time-delays in signal communications between any two agents are not symmetrical, the consensus value to which the state index values of the agents converge can be made equal to the average value of the initial values $x_i[0]$ of all agents. This finding is used in this disclosure.

This disclosure provides a distributed control system configured to control or manage respective states of a plurality of devices connected to each other via a communication network, according to consensus control of a multi-agent system as described above. The distributed control system is configured to control the states of the respective devices, according to a new control protocol that makes it possible to compensate for variations in a consensus value of state index values of agents due to delays in signal communications, even when communication delays of signals in the communication network are not symmetrical (including the case where there are symmetrical).

A first aspect of the disclosure is concerned with a distributed control system. The distributed control system includes a plurality of control units that controls respective states of a plurality of devices, and a communication network including a communication line that connects the control units. A state index value representing a selected state is measured in each of the devices. The state index value is transmitted, via the communication line, from a corresponding one of the control units to the control unit of an adjacent device as one of the devices. A state target value is determined according to consensus control of a multi-agent system, referring to the state index value of a self-device as one of the devices, and the state index value of the adjacent device. The control unit of each of the devices is configured to control the state of the self-device, such that the state index value of the self-device coincides with the state target value determined. The control unit of each of the devices is configured to determine the state target value, using the current state index value of the self-device, and a difference between the latest state index value of the adjacent device received from the control unit of the adjacent device, and the latest state index value of the self-device received by the control unit of the adjacent device. The self-device is a device of which the state is controlled by the control unit of each of the devices, and the adjacent device is a device of which the state is controlled by a control unit that is directly connected to the control unit of each of the devices, via the communication line.

In the first aspect, the "devices" may be any devices, such as energy sources, mobile bodies, various manufacturing machinery and appliances, and various sensors, of which the operating states are controlled. The "selected state" of the "devices" may be an arbitrarily selected state, such as any measurable physical quantity and/or its rate of change or rate of variability. The "state index value" is an actually measured value representing the "selected state", and the "state target value" is a target value to which the "state index value" is to be made equal, through control of the state. The "control unit" may be any type of control unit that measures the state index value representing any state of the device, and autonomously controls the state; typically, the "control unit" may use a computer, to control the state of the device as appropriate. The communication line that is connected between the control units of each pair of devices, and transmits signals representing state values of the devices may be a line that transmits signals in any fashion, via wire communication, wireless communication, or optical communication, for example. Also, in the first aspect, the "self-device" means a device of which the state is controlled by a corresponding one of the control units in the system, and the "adjacent device" means a device of which the state is controlled by a control unit directly connected to each control unit via the communication line. For a certain device, a device whose state is controlled by another control unit further connected via a communication line to the control unit connected via the communication line will be an adjacent device for the adjacent device.

In the above aspect, the consensus control may be average consensus control.

In the system configured as described above, the state target value of the control unit of each device is determined, using the current state index value of the self-device, and "a difference between the latest state index value of the adjacent device received from the control unit of the adjacent device and the latest state index value of the self-device received by the control unit of the adjacent device". Here, "the latest state index value of the adjacent device received from the control unit of the adjacent device" is the latest value, out of the state index values transmitted from the control unit of the adjacent device and received by each control unit (which is not the latest state index value sequentially measured at the adjacent device). Namely, where the time required to transmit the state index value from the control unit of the adjacent device to each control unit is called "first communication delay time", the state index value of the control unit of the adjacent device referred to in the distributed controller of the multi-agent system of the disclosure is the latest value of the state index values, which is measured by the adjacent device at a point in time that is ahead of a point in time at which the state index value is received by each control unit, by the first communication delay time. Also, "the latest state index value of the self-device received by the control unit of the adjacent device" is the latest value out of the state index values of the self-device transmitted from the control unit of the self-device and actually received by the control unit of the adjacent device (as a source of transmission of the state index value received by the control unit of the self-device) (it is not the latest state index value sequentially measured at the self-device). Namely, where the time required to transmit the state index value from the control unit of each self-device to the control unit of the adjacent device is referred to as "second communication delay time", the state index value of the control unit of the self-device referred to in the distributed controller of the multi-agent system of the disclosure is the latest value of the state index values measured in the self-device at a point in time that is ahead of a point in time at which the state index value is received by the control unit of the adjacent device, by the second communication delay time. Also, as will be described later in "DETAILED DESCRIPTION OF EMBODIMENTS" below, during operation of control, in the distributed controller of each control unit, the same state index values are referred to as the state index value of the adjacent device and the state index value of the self-device, respectively, (namely, when the device i and the device j exchange the state index values $x_i[k_b]$, $x_j[k_a]$ with each other, $x_i[k_b]$ that becomes a value of the adjacent device in the device j is referred to as a value of the self-device for the device i, and $x_j[k_a]$ that becomes a value of the adjacent device in the device i is referred to as a value of the self-device for the device j). Thus, the average of the state index values of the devices in the system is conserved, and the consensus value of the state index values of the devices can be stabilized.

In the above aspect, the control unit of each of the devices may be configured to send the state index value of the self-device to the control unit of the adjacent device, and send the latest state index value of the self-device, after the state index value of the self-device transmitted reaches the control unit of the adjacent device.

In the above aspect, when the control unit of each of the devices receives the state index value of the adjacent device transmitted from the control unit of the adjacent device, the control unit may be configured to notify the control unit of the adjacent device as a source of transmission of the state index value, of receiving of the state index value of the adjacent device.

In the system configured as described above, each control unit, as the receiving side of the state index value, can send a notification of receiving of the state index value back to the source of transmission. As a result, each control unit, as the sending side of the state index value, is able to be aware of arrival of the state index value at the receiving side. Thus, the distributed controller refers to the same state index value as the one received by the control unit of the adjacent device.

In the above aspect, the latest state index value of the self-device received by the control unit of the adjacent device for use in the difference may be the latest state index value of the self-device that receives a notification of receiving of the state index value of the self-device, from the control unit of the adjacent device.

In the multi-agent system, the amount of change of the state target value of each agent per cycle is determined (computation by the distributed controller (corresponding to the second term on the right side of Eq. (1)), by intermittently referring to the state index values of the adjacent agent, rather than using all of the state index values measured in time series by the adjacent agent. More specifically, when the amount of change of the state target value is determined by referring to the state index values of the adjacent agent, while skipping the state index values measured by the adjacent agent during a period from transmission of one state index value from the adjacent agent via the communication line to the time at which it reaches each agent (namely, the values referred to as the state index values of the adjacent agent are values obtained for each period from the time when a signal of the state index value is transmitted from the adjacent agent to each agent, to the time when a notification on arrival of the signal from each agent to the adjacent agent is reached), the convergence performance of the state index values of the agents to one consensus value is improved. Thus, as described above, in transmission of the state index value of the self-device of the control unit of each device to the control unit of the adjacent device, once the state index value of the self-device is transmitted, the control unit is configured to send the latest state index value of the self-device after waiting for arrival of the transmitted state index value of the self-device at the control unit of the adjacent device, and the control unit of each device intermittently refers to the state index value of the adjacent device, whereby the convergence performance of the state index values of the devices to one consensus value can be improved.

Also, in the system configured as described above, the control unit of each device may send the next (i.e., the latest) state index value following a response to a notification of information that the state index value of the self-device has reached the control unit of the adjacent device, from the control unit of the adjacent device, to the control unit of the adjacent device. In this case, when the control unit of each device does not receive notification of arrival of a signal of the state index value of the self-device, even after a lapse of a given time, from the control unit of the adjacent device, after transmission of the state index value, the control unit of the device (self-device) may send the next state index value (time-out process). Here, the "given time" may be set to a longer time than the time (communication delay time) required to transmit the signal of the state index value. Alternatively, where the communication delay time can be predicted, once the state index value of the self-device is transmitted, the control unit of each device may wait for a length of time corresponding to the communication delay time, and send the next state index value to the control unit of the adjacent device.

Also, the state index value of the self-device referred to in the distributed controller of each control unit is the value received by the control unit of the adjacent device. Thus, when the control unit that sends the state index value of each self-device to the control unit of the adjacent device is configured to send the latest state index value of the self-device after the transmitted state index value of the self-device reaches the adjacent device, the values intermittently transmitted to the adjacent device, out of the state index values measured in time series in the self-device, rather than all of the state index values measured in time series in the self-device, are used as the state index values of the self-device referred to in the distributed controller of each control unit In the above aspect, contribution of the difference to the state target value may be adjusted by a control gain.

In the system configured as described above, the control input of the distributed controller in the state target value of each device, namely, contribution of the difference between the latest state index value of the adjacent device received from the control unit of the adjacent device and the latest index value of the self-device received by the control unit of the adjacent device, is adjusted, so that the convergence performance of the state index values of the devices can be further improved.

In the above aspect, the control gain may be determined, based on at least one of a communication delay time of the state index value of the adjacent device when transmitted from the control unit of the adjacent device to the control unit of each of the devices, and a communication delay time of the state index value of the self-device when transmitted from the control unit of each of the devices to the control unit of the adjacent device.

In the system configured as described above, the convergence performance of the state index values of the respective devices depends on the communication delay time of the state index value between adjacent control units. Thus, the convergence performance of the state index values of the devices can be improved.

In the above aspect, the control gain may be determined, based on a longer one of the communication delay time of the state index value of the adjacent device when transmitted from the control unit of the adjacent device to the control unit of each of the devices, and the communication delay time of the state index value of the self-device when transmitted from the control unit of each of the devices to the control unit of the adjacent device.

In the system configured as described above, in response to a request to conserve the average of the state index values of the devices in the system, the control gain for a difference between the state index values of the mutually adjacent devices in each of the distributed controllers of the adjacent devices may be set to be equal to each other, so that contribution of the difference between the state index values in the distributed controllers of the mutually adjacent devices to the state target value of the adjacent devices becomes equal to each other. However, when the communication delays in the signals in the communication network are not necessarily symmetrical, the communication delay time (first communication delay time) of the state index value of the adjacent device when transmitted from the control unit of the adjacent device to each of the control units may be different from the communication delay time (second communication delay time) of the state index value of the self-device when transmitted from each of the control units to the control unit of the adjacent device. In this situation, in view of the fact that an influence on the convergence performance of the state index values increases as the communication delay time is longer, the influence on the convergence performance of the state index values can be reduced.

In the above aspect, the control gain may be reduced when the communication delay time based on which the control gain is determined is long in comparison with when the communication delay time based on which the control gain is determined is short.

In the system configured as described above, as the communication delay time between adjacent devices is longer, contribution of the difference between the state index values in the distributed controllers of the corresponding adjacent devices deteriorates the convergence performance of the state index values. In view of this situation, the above configuration makes it possible to reduce the contribution of the difference in the state index value between the adjacent devices having a long communication delay time.

In the above aspect, the control unit of each of the devices may be configured to determine the state target value, using the current state index value of the self-device, and a distributed controller. The distributed controller may consist of a sampling period and a control input of the distributed controller.

In the above aspect, the control input of the distributed controller may be determined, using a measurement time of the state index value of the adjacent device which is transmitted from the control unit of the adjacent device and received by the control unit of the self-device, and a measurement time of the state index value of the self-device which is transmitted from the control unit of the self-device and received by the control unit of the adjacent device.

In this connection, the control input of the distributed controller may be represented by the following equations.

$$u_i[k] = \sum_{j \in N_i}^{n} a_{ij}(x_j[k_{aj}] - x_i[k_{bi}]) \tag{5}$$

$$a_{ij} = \begin{cases} \dfrac{1}{1 + \max(|N_i|, |N_j|)} & : j \in N_i \\ 0 & : j \notin N_i \end{cases} \tag{5a}$$

In the above aspect, when the control input of the distributed controller is a sum of differences between the state index values of a plurality of the adjacent devices and the state index value of the self-device, the control gain may be set for each of the differences corresponding to the control unit of the adjacent device connected to the control unit of each of the devices.

In the system configured as described above, while the control unit of each device may be connected via the communication network to the control unit(s) of one or more adjacent devices, the control unit takes it into consideration that the communication delay time is different for each pair of adjacent control units.

In the above aspect, the distributed controller may be modified by using the control gain.

In this connection, the distributed controller may be modified as follows, based on the control gain as described above.

$$u_i[k] = \sum_{j \in N_i}^{n} G_{ij} \cdot a_{ij}(x_j[k_{aj}] - x_i[k_{bi}]) \tag{6}$$

where $u_i$ is the control input of the distributed controller, and $G_{ij}$ is a control gain set for each difference corresponding to the control unit of the adjacent device connected to each of the control units, and a function of $\max(\Delta_{ij}, \Delta_{ji})$ using a communication delay time (first communication delay time) $\Delta_{ij}$ in transmission of the state index value of the adjacent device from the control unit of the adjacent device to each of the control units, and a communication delay time (second communication delay time) $\Delta_{ji}$ in transmission of the state index value of the self-device from each of the control units to the control unit of the adjacent device.

In the above aspect, the control gain may be given by $$G_{ij} = \Gamma^{\max(\Delta_{ij}, \Delta_{ji})} \tag{7}$$

where $G_{ij}$ is the control gain, $\Gamma$ is a positive number smaller than 1, $\Delta_{ij}$ is a communication delay time of the state index value of the adjacent device when transmitted from the control unit of the adjacent device to the control unit of each of the devices, and $\Delta_{ji}$ is a communication delay time of the state index value of the self-device when transmitted from the control unit of each of the devices to the control unit of the adjacent device.

In this connection, the control gain $G_{ij}$ may be set to be equal to the control gain $G_{ji}$ in a control input of the corresponding distributed controller $u_j$. Then, the control gain $G_{ij}$ may be given by $$G_{ij} = \Gamma^{max(\Delta_{ij}, \Delta_{ji})}$$

using a positive number $\Gamma$ smaller than 1, first communication delay time $\Delta_{ij}$, and second communication delay time $\Delta_{ji}$.

In the above system, the control gain may be given by $G_{ij}=1/\{c \cdot max(\Delta_{ij}, \Delta_{ji})\}$, where $G_{ij}$ is the control gain, c is a positive coefficient, $\Delta_{ij}$ is a communication delay time of the state index value of the adjacent device when transmitted from the control unit of the adjacent device to the control unit of each of the devices, and $\Delta_{ji}$ is a communication delay time of the state index value of the self-device when transmitted from the control unit of each of the devices to the control unit of the adjacent device.

In the first aspect, there may be a plurality of communication lines, and the communication network may consist of the communication lines.

In the system configured as described above, when the control gain is determined based on the communication delay time of the state index value, the control unit of each device needs to check a point in time at which the state index value referred to in determination of the state target value was measured, and a point in time at which the state index value referred to was received by the control unit at the destination. To this end, the state index value of each device measured at each control unit is provided with a measurement time (measurement time stamp), which is transmitted, along with the state index value, to the control unit of the adjacent device, and the state index value received by each control unit is provided with a receiving time (receiving time stamp). Then, the communication delay time as a difference between the measurement time and the receiving time may be sent back to the control unit as the source of transmission of the state index value, and may be referred to in determination of the control gain.

According to respective aspects of the disclosure, in the distributed control system in which the respective devices are connected via the communication network, the state target value of the devices is determined, according to a new control protocol with which the average of the state index values of the devices is conserved even if asymmetrical time-delays are generated in transmission of the state index values between the control units of the devices. While asymmetrical time-delays are inevitably generated in transmission of signals due to various factors, in the communication network of the actual distributed control system, as described above, it is possible to compensate for an influence of the time-delays in transmission of the state index values under the consensus control of the multi-agent system. Thus, the distributed control system that can appropriately control the state of each device according to the consensus control is expected to be more widely used.

Other objects and advantages of the disclosure will become apparent from the following description of embodiments of the disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1A:
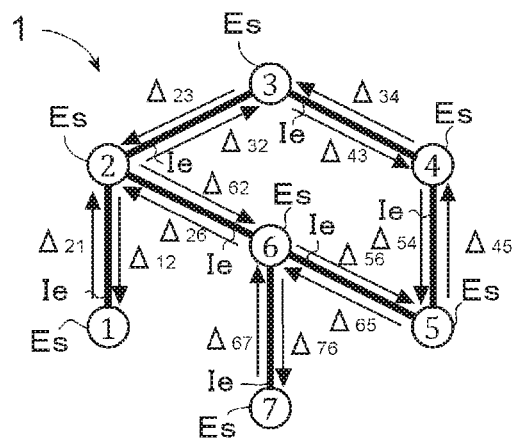
FIG. 1A is a view schematically showing the configuration of a distributed control system of one embodiment.

Referring to the drawings, some embodiments of the disclosure will be described in detail. In the drawings, the same signs denote the same components or portions.

Referring to FIG. 1A, in a distributed control system 1 as one embodiment of the disclosure, control units Es (agents) of a plurality of devices are connected to each other via communication lines Ie, so as to constitute a communication network. Each of the agents Es is configured to obtain state index values representing selected states of adjacent devices (neighbor devices), through the communication network. In this system, the devices that are subject to control and/or management may be selected as desired, from, for example, energy sources in a distributed energy management system, namely, any machinery and appliances or devices that deliver energy through various media or on various carriers (e.g., generators (e.g., synchronous generators, and asynchronous generators), solar cells, windmills (e.g., power generators), waterwheels (e.g., water power generators), fuel cells, chemical cells, storage cells, other power generation devices, chargers, chargers and dischargers, light emitters, heaters, coolers, boilers, engines, gas turbines, and steam engines), mobile bodies (e.g., vehicles, aircrafts, ships, and artificial satellites), various manufacturing machinery and appliances or processing machinery and appliances in industrial plants, and various sensors in sensor networks. Further, the distributed control system may consist of any devices of which operation is controlled and managed by use of the IoT (Internet of things) technology. Also, the state to be controlled in the distributed control system may be selected from any measurable physical quantities of each device and/or their rates of change or rates of variability, for example, output (power), voltage, pressure, temperature, torque, driving force, braking force, electromagnetic force, electromagnetic field strength, radio field strength, frequency, oscillation frequency, phase, power factor, clock time, current, flow rate, flow speed, volume, electric charge density, magnetic flux density, enthalpy, energy amount (such as the amount of heat stored, and the amount of charge), moving speed, acceleration, rotating speed, operating speed, rate of change of speed, and so forth. The communication network may be constructed in any form, such as wire communication, wireless communication, or optical communication. In each agent Es, a state index value of each of the agents in the system is controlled so as to be equal to a control target value determined using corresponding state index values of other agents obtained via the communication network, according to a control protocol of the multi-agent system. In particular, in the example of FIG. 1A to FIG. 1D, the system provides an undirected graph to which all agents are connected; in this case, in the configuration where consensus control is executed as the control protocol, "average consensus control" is performed in which a consensus value is the average of the initial values of the state index values of all agents. In this specification, the case where the average consensus control is performed as consensus control will be described, as shown in the example of FIG. 1A to FIG. 1D. However, the disclosure may be applied to the case where leader-follower consensus control or other consensus control is performed, depending on the form of the graph of the system, and it is to be understood that this case is also within the scope of this disclosure.

Figure 1B:
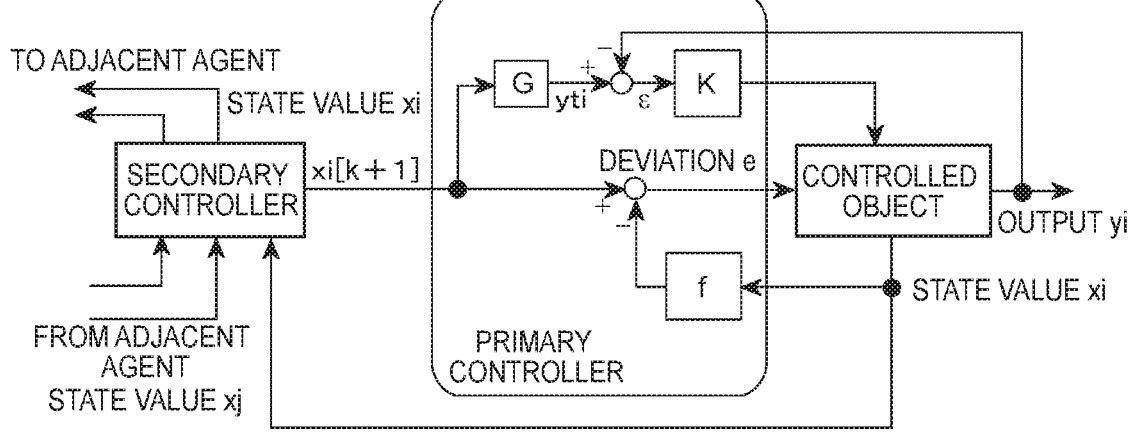
FIG. 1B is a block diagram showing the configuration of a control unit (agent) of each device in the system of this embodiment.

In the above system, the control unit of each agent i (i, j, . . . are signs suffixed to agents) may typically consist of a primary controller that controls a selected state and output of a controlled object, or a device, and a secondary controller that determines a target value of the selected state of the device, as schematically depicted in FIG. 1B. Typically, the control unit of each agent may be a computer, and is generally equipped with a CPU, memory, and input-output device (I/O), which are connected to each other via a bidirectional common bus (not shown). Operation of each part in the unit is implemented by executing a program in the CPU. More specifically, the primary controller receives an index value (state index value) $x_i[k]$ of the selected state measured in the controlled object, and a target value (state target value) $x_i[k+1]$ of the state transmitted from the secondary controller, and operates to control the state of the controlled object so that a deviation "e" of the state index value from the state target value becomes equal to zero (feedback control of the state). The output of the controlled object may be controlled so that a deviation e of the output $y_i$ of the controlled object from a target value $y_{ti}$ of the output of the controlled object determined, using a transfer function G, from the state target value received from the secondary controller, becomes equal to zero (feedback control of the output, servo control, which may be omitted when the output is controlled depending on the selected state). Also, a control process of the state and/or output in the controlled object may be executed according to the selected state and the type of the output. Those skilled in the art can appropriately determine a specific example of the control process, according to the selected state. On the other hand, the secondary controller determines the state target value of its own controlled object, using the state index value $x_i$ of its own controlled object, and state index values $x_j$ of controlled objects of adjacent agents connected via communication lines, so that the state index value of its own controlled object becomes equal to or converges to a consensus value, in a manner as will be described in detail later.

Figure 1C:
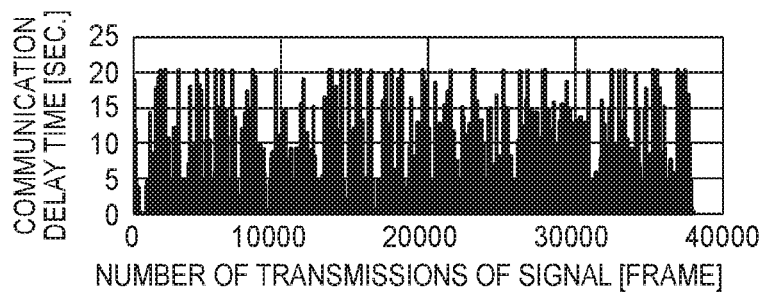
FIG. 1C shows an example of communication delay time observed in a communication network used in an actual distributed control system.
Figure 1D:
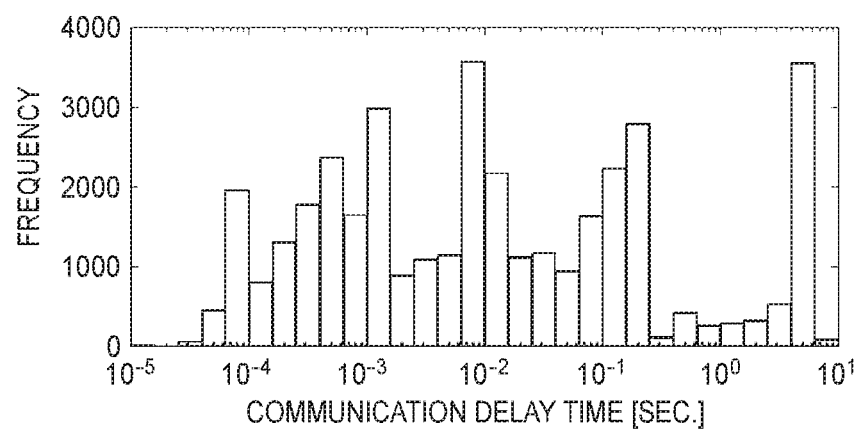
FIG. 1D is a histogram indicating the frequency of appearance of each length of the communication delay time generated between agents of the distributed control system.

In the distributed control system shown in FIG. 1A, the state index value representing the selected state of each agent is transmitted as a signal to adjacent agents through communication lines Ie, as described above. In other words, each agent receives the signals of the state index values from the adjacent agents via the communication lines Ie. Regarding communication of the signal of the state index value between the agents, in an actual communication network, it takes a finite length of time until the signal of the state index value from an adjacent agent reaches each agent, namely, from the time when the adjacent agent sends the signal of the state index value to the time when each agent receives the signal, due to various factors, as described above in "SUMMARY". Thus, delays inevitably arise in signal communications. Also, delays in signal communications in both directions between any given two agents are not necessarily symmetrical, and a length of time (communication delay time) $\Delta_{ji}$ required for communication of a signal from the agent i to the agent j is not necessarily equal to a communication delay time $\Delta_{ij}$ required for communication from the agent j to the agent i. As shown in FIG. 1C and FIG. 1D, byway of example, the communication delay time randomly varies to various lengths, within a certain range.

In the meantime, as described in the "SUMMARY", in the arithmetic processing of consensus control of the conventional multi-agent system, which uses the difference equation of Eq. (1) above, the communication delay time that appears in the communication network as described above is not taken into consideration. If the above difference equation of Eq. (1) is used as it is in consensus control, under the environment where the communication delay time arises in the communication network, the state index values of respective agents may not converge to the consensus value, or an error arises in the consensus value, or the consensus value may vary. Namely, if the arithmetic processing of consensus control of the conventional multi-agent system is used as it is in the actual distributed control system as described above, stable consensus control may not be achieved. Thus, in this embodiment, the configuration of the secondary controller of the control unit of each agent is improved, so that signal communication and arithmetic processing are performed according to a new control protocol that can cause the state index values of the agents to stably converge to the consensus value, even under the environment where the communication delay time arises in the communication network, in particular, in the case where the communication delay times between the agents are not symmetrical, as will be described in detail below.

Arithmetic Processing of Consensus Control of Conventional Multi-Agent System

Figure 7A:
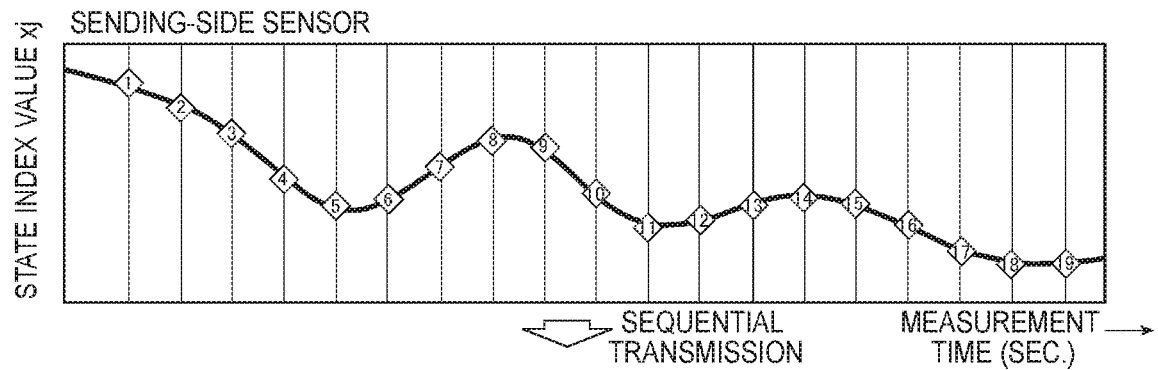
FIG. 7A is a time chart indicating the timing of measurement of state index values in a sending-side agent (adjacent device) in the case where transmission of the state index values is sequentially performed according to a conventional control protocol, in the distributed control system as shown in FIG. 1A to FIG. 1D, wherein measurement times coincide with computation times.
Figure 7B:
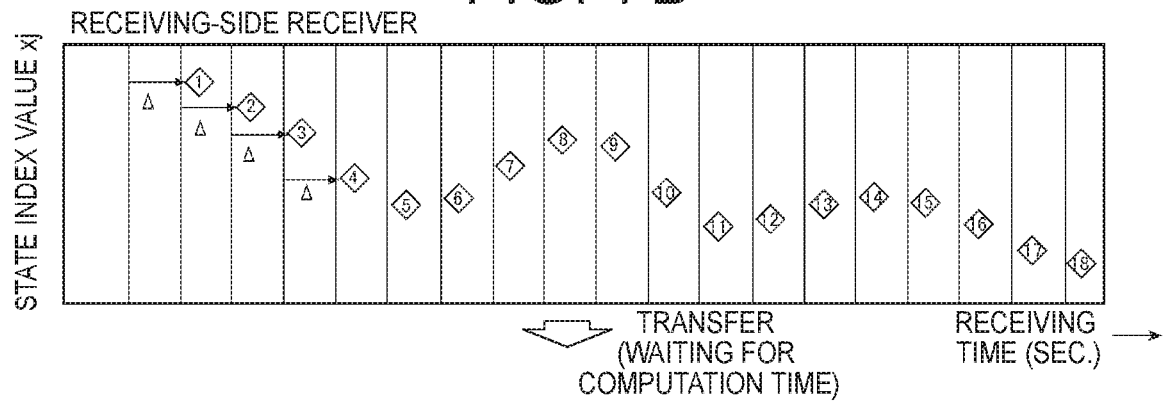
FIG. 7B is a time chart indicating the timing of receiving of the state index values, in the case where transmission of the state index values is sequentially performed according to the conventional control protocol in the distributed control system as shown in FIG. 1A to FIG. 1D.
Figure 7C:
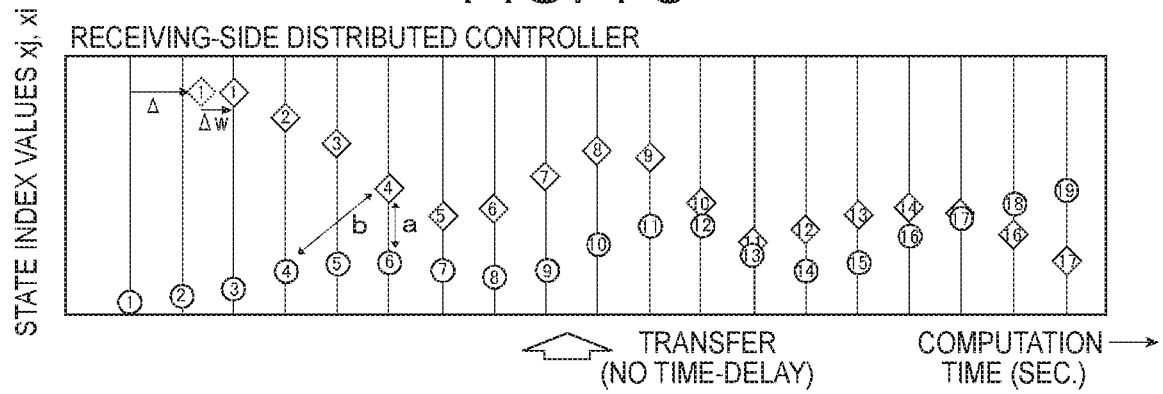
FIG. 7C is s a time chart indicating the timing of computation of state target values in a receiving-side agent (self-device) in the case where transmission of the state index values is sequentially performed according to the conventional control protocol in the distributed control system as shown in FIG. 1A to FIG. 1D, wherein measurement times coincide with computation times.
Figure 7D:
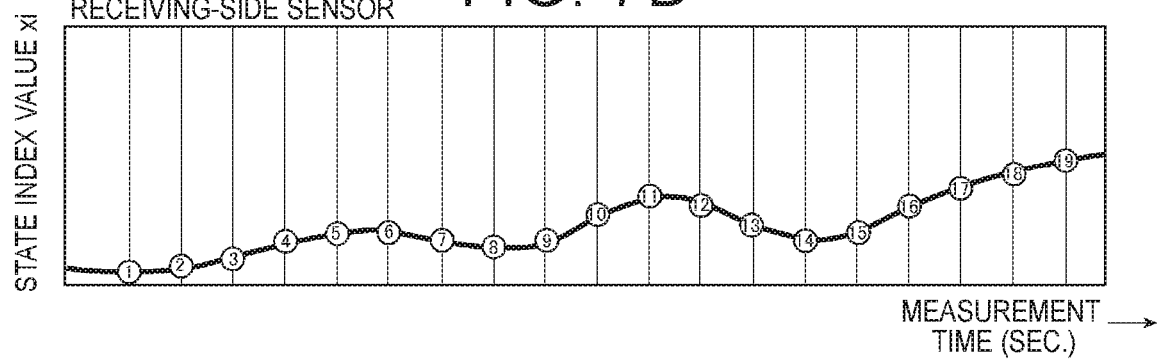
FIG. 7D is a time chart indicating the timing of measurement of the state index values in the receiving-side agent (self-device) in the case where transmission of the state index values is sequentially performed according to the conventional control protocol in the distributed control system as shown in FIG. 1A to FIG. 1D, wherein measurement times coincide with computation times.
Figure 8A:
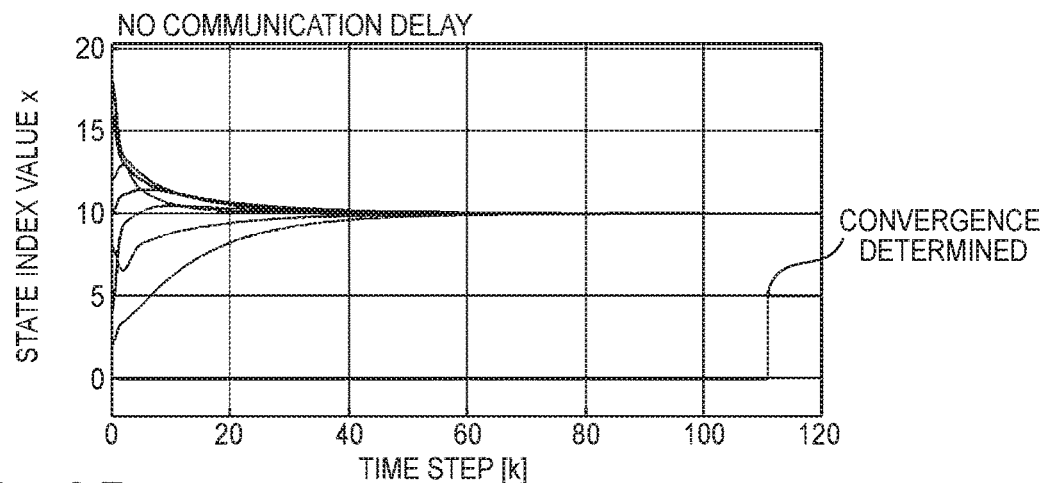
FIG. 8A shows the result of a calculation simulation of changes of state index values of respective agents with time, which result is obtained according to the conventional control protocol (with no correction) described in FIG. 7A to FIG. 7D, in the case where the measurement time (sampling time) interval is 1.0 sec., and there is no communication delay time, in the distributed control system as shown in FIG. 1A to FIG. 1D.
Figure 8B:
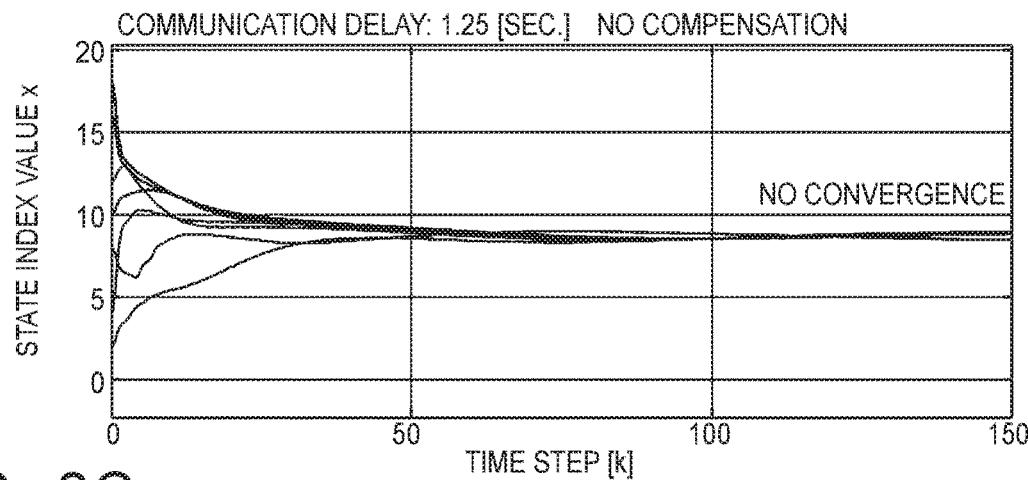
FIG. 8B shows the result of a calculation simulation of changes of state index values of respective agents with time, which result is obtained according to the conventional control protocol (with no correction) described in FIG. 7A to FIG. 7D, in the case where the measurement time (sampling time) interval is 1.0 sec., and communication delay times of 1.25 sec. symmetrically appear in signal transmissions between agent 6 and agents 2, 5, 7 of FIG. 1A to FIG. 1D, in the distributed control system shown in FIG. 1A to FIG. 1D.

Before the control configuration according to this embodiment is described, phenomena that appear in the conventional control configuration will be briefly described. Referring to FIG. 7A to FIG. 7D, in each agent of the system, typically, the state index value representing a selected state of each device (controlled object) is sequentially measured by a sensor at predetermined time intervals (measurement times or sampling times) that may be set as desired, and the state index values thus measured are transmitted as signals to adjacent agents via communication lines, for use in determination of the state target values in the adjacent agents. Then, in the consensus control of the multi-agent system, in the case of the conventional system, each agent (secondary controller) generally uses the state index value $x_i[k]$ measured in the self-device and the state index values $x_j[k]$ measured in the adjacent agents, to calculate the state target value $x_i[k+1]$ representing the state to be taken by the self-device at the next measurement time, and this target value is given to an adder for feedback control of the state in the primary controller. Here, assuming that the state index value $x_j[k]$ of each adjacent agent reaches each agent instantly, the state index values of all of the agents in the system converge to the consensus value (in this case, the average of the initial values of the state index values of all agents, as indicated in Eq. (2)), by computing the state target value according to Eq. (1) (the measurement times and computation times of each agent are supposed to be substantially equal). FIG. 8A shows an example of calculation simulation of changes of the state index values of all of the agents with time, when they converge to the consensus value. In the actual distributed control system, as described above, after the secondary controllers calculate the state target value, the primary controller performs servo-control on the state of the controlled object, so that the state index value of the controlled object becomes equal to the state target value; therefore, the state target value and the state index value may not coincide with each other. However, since changes (FIG. 8A to FIG. 8C, FIG. 5A, FIG. 5B, FIG.

Figure 6A:
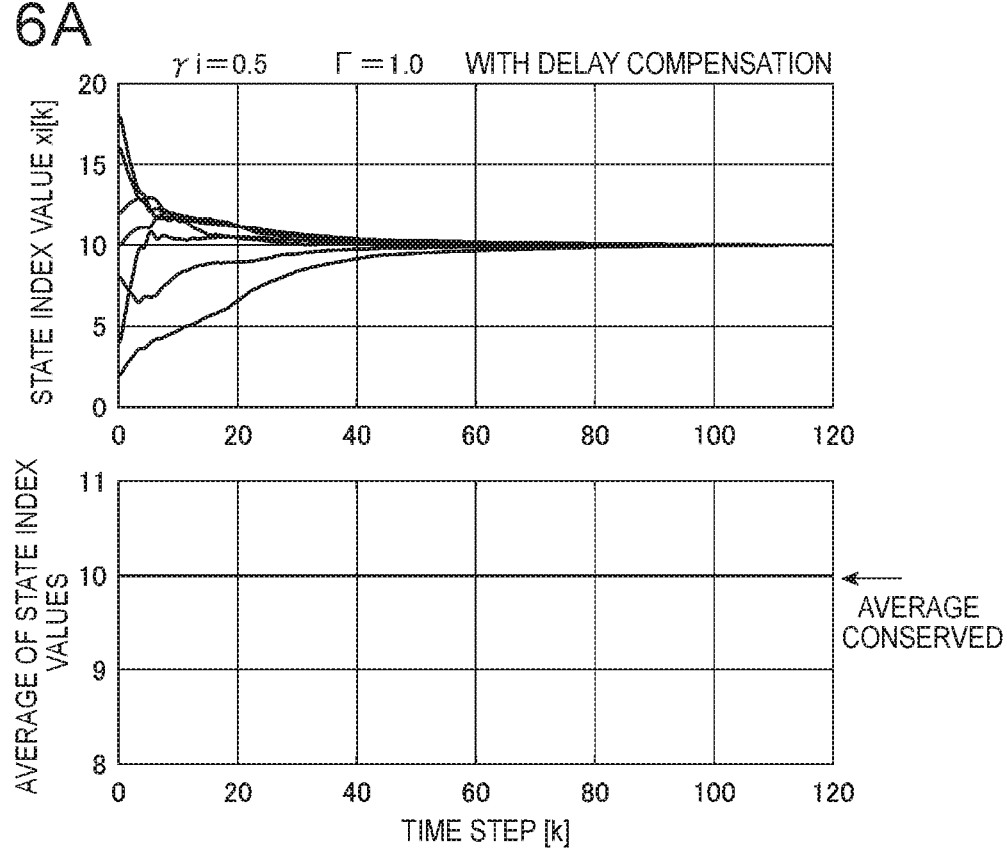
FIG. 6A shows the result of a calculation simulation of changes of the state index values of respective agents with time, which result is obtained according to a control protocol (reference correction) for compensating for delays in communication of the state index values between agents, where the control gain $\gamma_i$ of the distributed controller as a whole relative to the state target value is 0.5, and the constant coefficient $\Gamma$ that gives the control gain $G_{ij}$ determined for each pair of adjacent agents is 1 (without control gain correction), in the distributed control system shown in FIG. 1A to FIG. 1D.
Figure 6B:
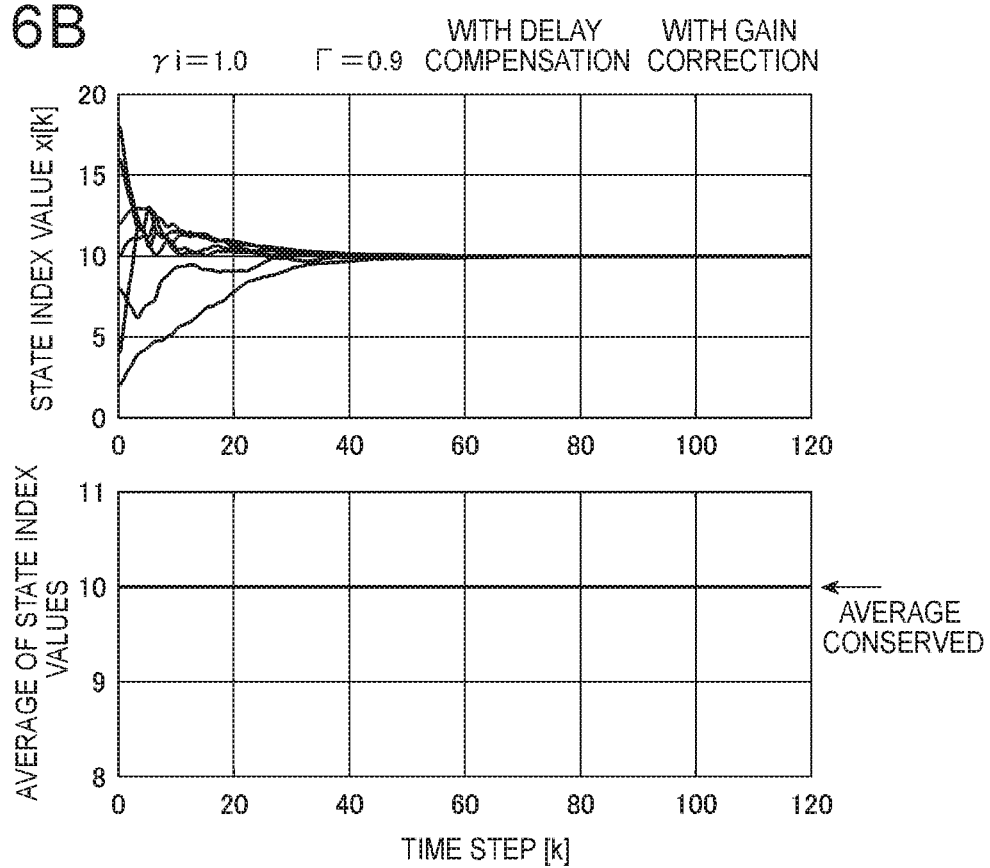
FIG. 6B shows the result of a calculation simulation of changes of the state index values of respective agents with time, which result is obtained according to a control protocol (reference correction) for compensating for delays in communication of the state index values between agents, where the control gain $\gamma_i$ of the distributed controller as a whole relative to the state target value of each agent is 1.0, and the constant coefficient $\Gamma$ that gives the control gain $G_{ij}$ determined for each pair of adjacent agents is 0.9 (with control gain correction), in the distributed control system shown in FIG. 1A to FIG. 1D.

6A, and FIG. 6B) of the state index values of the agents with time in the drawings attached to this specification are results of calculation simulations, the state index values are supposed to coincide with the state target values. Here, in the examples of the calculation simulations shown in FIG. 8A and FIG. 8B, the initial values of the state index values of the agents are randomly given such that the average of these initial values becomes equal to 10. Also, the "CONVERGENCE DETERMINED" in FIG. 8A indicates a point in time at which differences between the state index values of the agents are held within ±0.01%.

In the actual communication network, it takes a finite time to communicate the signal of the state index value as described above. Thus, as shown in FIG. 7B, a clock time at which the signal (◇) of the state index value of the agent on the sending side (sending-side agent) reaches the receiver of the agent on the receiving side (receiving-side agent) is delayed by a communication delay time Δ from the measurement time of the state index value. If the receiving-side agent sequentially computes the state target value, using the latest state index value, without taking account of the delay of communication, the computation is performed according to the following equation.

$$x_i[k+1] = x_i[k] + \sum_{j \in N_i}^{n} a_{ij}(x_j[k-\delta k] - x_i[k]) \quad (8)$$

In Eq. (8) above, "k−δk" is a measurement time immediately before a point in time that is ahead of the current time k by the communication delay time Δ (δk is a sampling time interval corresponding to the sum of the communication delay time Δ and the standby time Δw after receiving, see FIG. 7C). Then, as indicated by symbol "a" in FIG. 7C, there is a difference between the measurement time of the state index value of the sending-side agent and that of the receiving-side agent in the distributed controller (the second term on the right side of Eq. (1)). In this case, if the state target value is computed, the state index values of all of the agents may converge to the consensus value, but the consensus value may deviate from an expected consensus value (in the case where the communication delay time is not equal to zero, but is equal to or shorter than the sampling time interval). As other phenomena that may be observed, the state index values of all of the agents may not converge (in the case of FIG. 8B where the communication delay time exceeds the sampling time interval), or the state index values of all of the agents may converge to a certain consensus value, but the consensus value may oscillate with time (this phenomenon is not shown).

Also, in another example of the configuration, the measurement time is recorded at the same time that the state index time of each agent is measured, and the state index value is transmitted to the adjacent agents, along with data of the measurement time. With this configuration, the state target value is computed (with time-stamp correction), using an expression (Eq. (9) below) in which the distributed controller (the second term on the right side of Eq. (1)) is modified such that the measurement time of the state index value of the sending-side agent coincides with that of the receiving-side agent, as indicated by symbol "b" in FIG. 7C.

In this case, when the communication delay time is not equal to zero, but is equal to or shorter than the sampling time interval, the state index values of all of the agents converge to the expected consensus value. However, when the communication delay time exceeds the sampling time interval even by a little, the state index values of all agents do not even show a tendency to converge to the consensus value.

Improvement in Arithmetic Processing of Consensus Control of Multi-Agent System (A) Intermittent Transmission Correction As described above, under the environment where a finite delay time appears in signal communication between each pair of agents in the distributed control system, consensus control may not be stably achieved, depending on conditions of delays in single communication, according to the control protocol using Eq. (1) (or Eq. (8), Eq. (9)) that is generally known in the related art. However, as stated in "SUMMARY" above, in connection with a process in which each agent sends state index values to an adjacent agent, the inventors of this disclosure proposed intermittent transmission correction for improving the convergence performance of the state index values of the agents, by changing the control protocol so as to send not all of the state index values measured by each agent, but intermittently send some of the state index values, in the manner as follows.

Figure 2A:
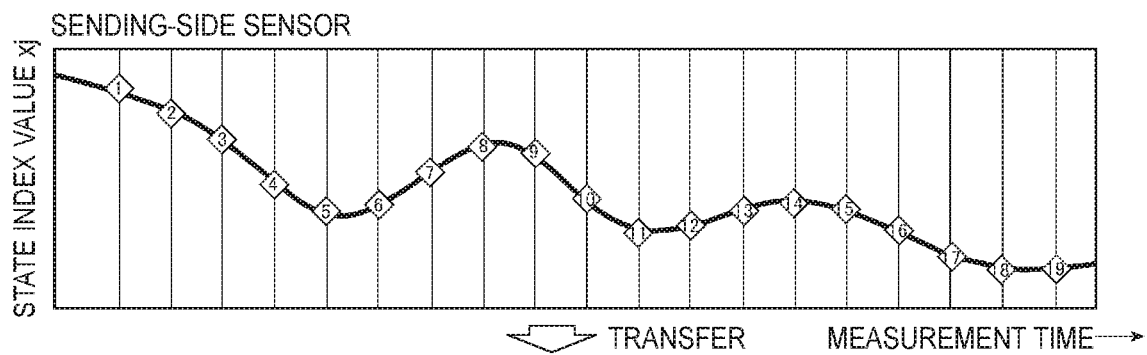
FIG. 2A is a time chart indicating the timing of measurement of state index values when each agent (sending side) intermittently sends the state index values to an adjacent agent (receiving side), in the distributed control system as shown in FIG. 1A to FIG. 1D, wherein measurement times coincide with computation times.
Figure 2B:
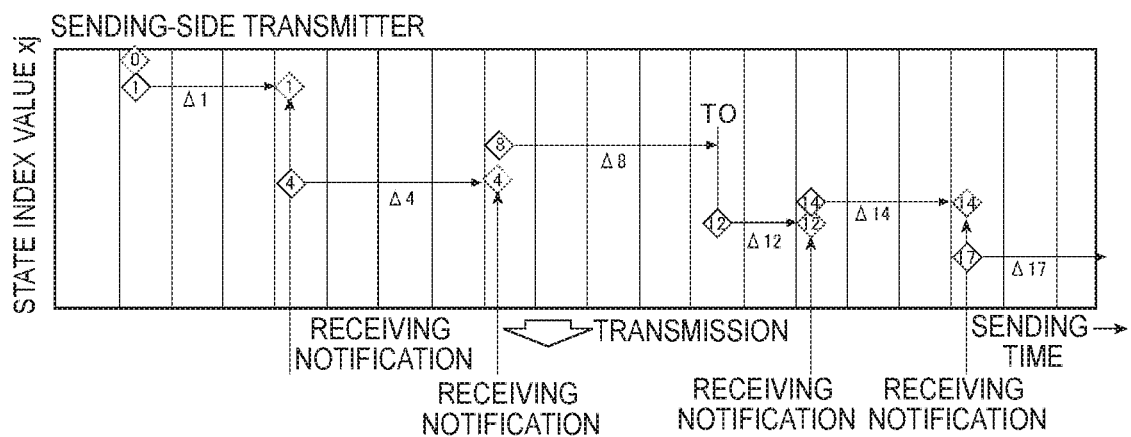
FIG. 2B is a time chart indicating the timing of sending and receiving of state index values when the sending-side agent intermittently sends the state index values to the receiving-side agent, in the distributed control system as shown in FIG. 1A to FIG. 1D.
Figure 2C:
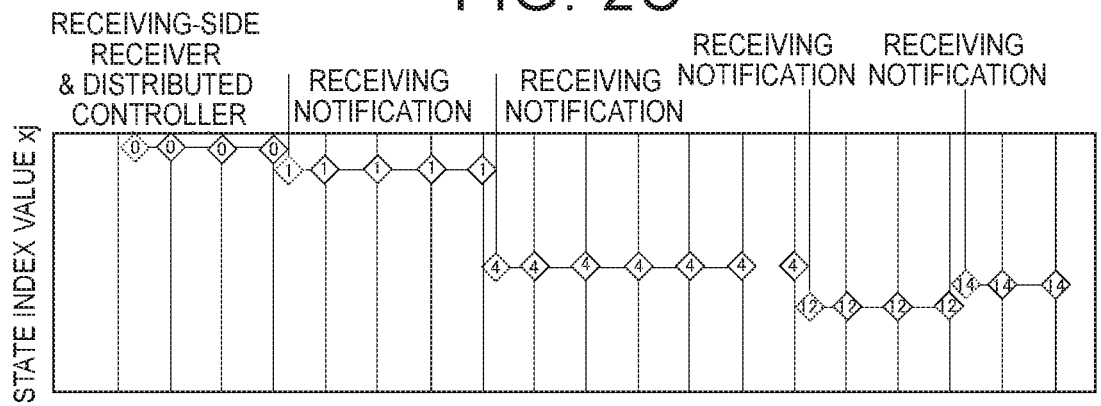
FIG. 2C is a time chart (intermittent transmission correction) indicating the timing of computation of state target values when the sending-side agent intermittently sends the state index values to the receiving-side agent, in the distributed control system as shown in FIG. 1A to FIG. 1D, wherein measurement times coincides with computation times.

More specifically, referring to FIG. 2A to FIG. 2C, (1) once each agent, as a sending-side agent, sends a state index value to an adjacent agent (receiving-side agent), the agent is kept from sending further state index values even if the state index values are sequentially measured. Then, when the sending-side agent is notified, from the adjacent agent as the destination of transmission, that the state index value transmitted has reached the adjacent agent as the destination, the agent sends the latest measurement value of the state index value, in response to the notification (FIG. 2B). Namely, the agent does not send state index values measured after transmission of the state index value until notification of completion of the transmission is received. In this connection, when each agent does not receive the notification of receiving from the receiving-side agent, after transmission of the state index value, for more than a predetermined length of time that may be set as desired, the agent may send the latest state index value measured at this point in time (see "TO" representing time-out process in FIG. 2B). (2) When each agent, as a receiving-side agent, receives a state index value transmitted from an adjacent agent (sending-side agent), the agent sends a notification of receiving to the adjacent agent as the source of transmission (FIG. 2C). Since the length of time required for notification of receiving from the receiving-side agent to the sending-side agent is generally far shorter than the time required to transmit the state index value or the sampling time interval, the time width from sending to receiving of the notification of receiving is omitted (not illustrated) in the drawings.

As described above, when each agent, as a sending-side agent, changes the manner of sending its state index values, each agent, as a receiving-side agent, uses the latest value of the state index values received from the source of transmission, as the state index value of the adjacent agent, in the distributed controller (corresponding to the second term on the right side of Eq. (1)) for computing the state target value (FIG. 2C). Namely, Eq. (1) used for computing the state target value is modified as follows.

$$x_i[k+1] = x_i[k] + \sum_{j \in N_i}^{n} a_{ij}(x_j[k-\delta k] - x_i[k-\delta k]) \quad (9)$$

$$x_i[k+1] = x_i[k] + \sum_{j \in N_i}^{n} a_{ij}(x_j[k_{aj}] - x_i[k]) \quad (10)$$

In Eq. (10), $k_{aj}$ denotes the measurement time of the state index value transmitted from the sending-side agent j, and is expressed as $$k_{aj} = l_{aj} - \delta k \tag{10a}$$

$$\delta k = \Delta s + \Delta_{ij} + \Delta r \tag{10b}$$

using the initial measurement time $l_{aj}$ (<k (current time)) after receiving of the value at the receiving-side agent i. Here, $\Delta s$ denotes a standby time from the measurement time $k_a$ immediately before the sending time of the sending-side agent to the sending time, and $\Delta r$ denotes a standby time from the time when the receiving-side agent receives the state index value from the sending-side agent, to the computation time, while $\Delta_{ij}$ denotes a communication delay time, namely, the time required for signal transmission from the sending-side agent j to the receiving-side agent i (which may include time it takes until the notification of receiving is received, where the notification of receiving is sent from the receiving-side agent to the sending-side agent). According to this protocol, once the receiving-side agent receives the state index value of the sending-side agent (adjacent agent), the state index value continues to be used in the distributed controller, until the next state index value of the sending-side agent is received. Also, in each agent, the state index values of adjacent agents used in the distributed controller may be updated for each adjacent agent (for example, measurement times $k_{aj}$ of the state index values of the agents 2, 5, 7 used in the distributed controller may be different from one another, in the agent 6 of FIG. 1A to FIG. 1D).

Figure 8C:
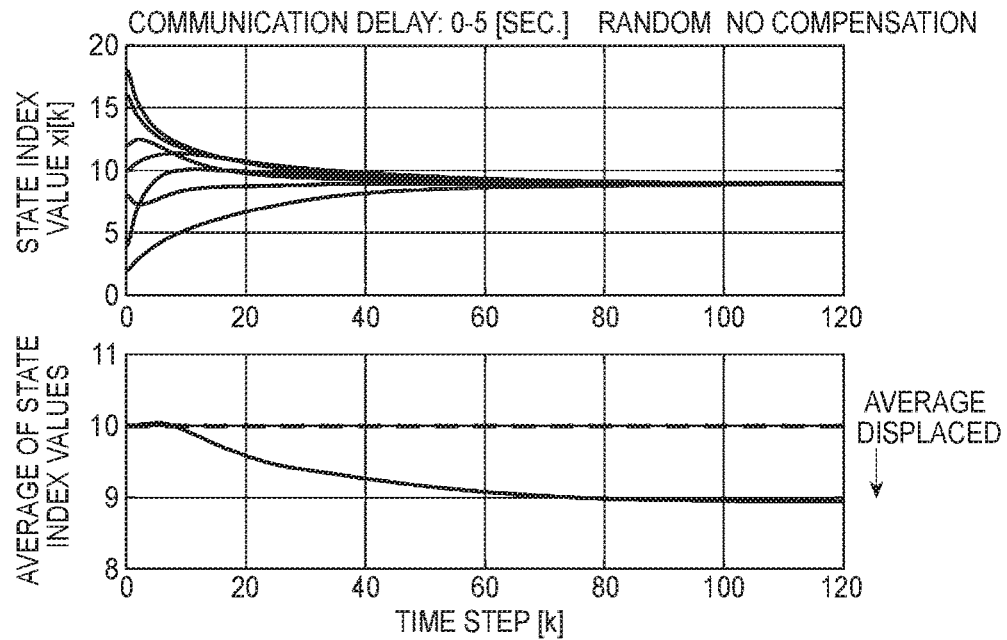
FIG. 8C shows the result of a calculation simulation of changes of state index values of respective agents with time, which result is obtained according to the conventional control protocol (with no correction) described in FIG. 7A to FIG. 7D, in the case where the communication delay time generated in transmission of the state index values between the agents is randomly generated between 0 to 5 sec., and the state index values are transmitted from each agent, such that the next state index value is transmitted after the agent receives a notification of receiving of the previously transmitted state index value from an agent as a destination (after checking arrival of the state index value previously transmitted) (intermittent transmission correction), in the distributed control system as shown in FIG. 1A to FIG. 1D.

If the state target value is computed, by using Eq. (10) with application of the intermittent transmission correction, the likelihood to converge the state index values of all agents to the consensus value can be significantly improved, even when the communication delay time randomly changes in a range that exceeds the sampling time interval while the state index value is changing with time, as illustrated in the result of calculation simulation in the upper section of FIG. 8C. In the example of FIG. 8C, the state index values referred to in the distributed controller of each agent are the latest state index value of the adjacent device received from the adjacent agent, and the latest state index value of the self-device obtained at the computation time (no reference correction). FIG. 8C shows the result obtained by multiplying the second term of Eq. (10) as the input of the distributed controller with a control gain $\gamma_i=0.5$, so as to increase the speed of convergence of the state index values. However, in the case of the average consensus control, mere application of the intermittent transmission correction results in change of the average of the state index values of all of the agents, as indicated in the lower section of FIG. 8C, and the problem that the consensus value to which the state index values converge does not coincide with the expected value (in this case, the average of the initial values of the state index values of all agents), namely, a deviation of the consensus value, is not eliminated. In fact, it is observed that the deviation of the consensus value increases, and the convergence time is prolonged, as the communication delay time is longer.

(B) Reference Correction

As described above, when the state index value is controlled according to Eq. (1) or any of Eq. (8) to Eq. (10), under the environment where a finite delay time appears in signal communication between each pair of agents in the distributed control system, the average of the state index values of all agents connected to the undirected graph is not conserved; as a result, even if the state index values converge to the consensus value, through application of the intermittent transmission correction, for example, the consensus value may deviate from the average of the initial values of the state index values of all agents as the expected value. Meanwhile, when no communication delay time appears in signal transmission between the agents in the system, differences of terms associated with any given two agents i, j, in the respective control inputs of distributed controllers $u_i$, $u_j$, are $(x_j[k]-x_i[k])$ and $(x_i[k]-x_j[k])$, namely, the same values $x_i[k]$ and $x_j[k]$ are referred to in these terms. Thus, in sum, the state index values referred to in the distributed controller of each agent in the system are common with those of the adjacent agent, so that the average of the state index values of all agents is conserved. However, according to the conventional control protocol of the state index value of the agent, when there is a communication delay time in signal transmission between the agents in the system, the state index value of the self-device referred to in the distributed controller of each agent may differ from that transmitted to its adjacent agent. Accordingly, in the distributed controller of the adjacent agent, the state index value of the self-device does not necessarily coincide with that referred to as the state index value of an adjacent agent for the adjacent agent; as a result, the average of the state index values of all of the agents is not conserved. Thus, in this embodiment, the control protocol is modified so that the state index value of the self-device referred to in the distribution controller of each agent becomes equal to that transmitted to the adjacent agent, so that the average of the state index values of all agents can be conserved (this correction of the control protocol will be called "reference correction").

Theoretically, the control input of the distributed controller $u_i$ in Eq. (1) is modified as follows.

$$u_i[k] = \sum_{j \in N_i}^{n} a_{ij}(x_j[k - \Delta_{ij}[k]] - x_i[k - \Delta_{ji}[k]]) \tag{11}$$

In Eq. (11), $\Delta_{ij}[k]$ is a communication delay time required for signal transmission from the agent j adjacent to the agent i, to the agent i, and $x_j[k-\Delta_{ij}[k]]$ is a state index value of the agent j at a time ahead of the current time k by $\Delta_{ij}[k]$, which was received by the agent i, while $\Delta_{ji}[k]$ is a communication delay time required for signal transmission from the agent i to the agent j, and $x_i[k-\Delta_{ji}[k]]$ is a state index value of the agent i at a time ahead of the current time k by $\Delta_{ji}[k]$, which was received by the agent j. In this connection, $\Delta_{ij}[k]$ and $\Delta_{ji}[k]$ may not be constant, but vary with time.

According to Eq. (11) above, the average of the state index values of all agents that constitute the undirected graph is conserved, as proved as follows. Initially, Eq. (11), which is subject to z transformation, is expressed as:

$$U_i[z] = \sum_{j \in N_i}^{n} a_{ij}\left(\frac{1}{z^{\Delta_{ij}[k]}}Q_j[z] - \frac{1}{z^{\Delta_{ji}[k]}}Q_i[z]\right) \tag{12}$$

where $U_i[z]$, $Q_i[z]$, and $Q_j[z]$ are z transforms of $u_i[k]$, $x_i[k]$, and $x_j[k]$, respectively. Accordingly, the control input of the distributed controller U of all agents is represented by $$U[z] = -L^d_a[k]Q[z] \tag{13}$$

using a graph Laplacian $L^d_a[k]$, and a vector $Q[z]$ having z transforms of the state index values of all agents as components. Here, the graph Laplacian $L^d_a[k]$ is expressed as follows.

$$L^d_a[k] = \begin{bmatrix} \sum_{j \in N_1} \frac{1}{z^{\Delta_{j1}[k]}} a_{1j} & -\frac{1}{z^{\Delta_{12}[k]}} a_{12} & \cdots & -\frac{1}{z^{\Delta_{1n}[k]}} a_{1n} \\ -\frac{1}{z^{\Delta_{21}[k]}} a_{21} & \sum_{j \in N_2} \frac{1}{z^{\Delta_{j2}[k]}} a_{2j} & \ddots & -\frac{1}{z^{\Delta_{2n}[k]}} a_{2n} \\ \vdots & \ddots & \ddots & \vdots \\ -\frac{1}{z^{\Delta_{n1}[k]}} a_{n1} & -\frac{1}{z^{\Delta_{n2}[k]}} a_{n2} & \cdots & \sum_{j \in N_n} \frac{1}{z^{\Delta_{jn}[k]}} a_{nj} \end{bmatrix} \quad (14)$$

Then, when the graph Laplacian $L^d_a[k]$ is multiplied from the left by a row vector $1^T_n$ in which all components are 1, $$1^T_n L^d_a[k] = 0^T \quad (15)$$

where $0^T$ is a row vector in which all components are 0. Thus, it can be said that change of the sum of the state index values of all agents is zero, and the average of the state command values of all agents is conserved.

When the control protocol is modified by applying the above intermittent transmission correction to the state index value of each agent, the control input of the distributed controller $u_i$ (of a time region) is expressed as follows.

$$u_i[k] = \sum_{j \in N_i}^n a_{ij}(x_j[k_{aj}] - x_i[k_{bi}]) \quad (16)$$

$$a_{ij} = \begin{cases} \frac{1}{1 + \max(|N_i|, |N_j|)} & : j \in N_i \\ 0 & : j \notin N_i \end{cases} \quad (16a)$$

where $k_{aj}$ is a measurement time of the latest state index value transmitted from the adjacent agent j and received by the agent i, and $k_{bi}$ is a measurement time of the latest state index value transmitted from the agent i and received by the agent j. It is to be understood that, when intermittent transmission correction is applied, to reference correction with which the value referred to as the state index value of the self-device in the distributed controller of each agent is one of those transmitted to the adjacent agent, the state index value $x_i$ which the agent i refers to in the control input of the distributed controller $u_i$ is also one of the values intermittently transmitted to and received by the adjacent agent, out of the state index values measured in time series. In this point, each agent is not aware of whether the state index value transmitted by itself to the adjacent agent has reached the adjacent agent, merely by transmitting the state index value. Accordingly, in this embodiment, once notification of arrival of the transmitted state index value at the adjacent agent is received from the adjacent agent at the destination, each agent may use the state index value transmitted, in the distributed controller. Namely, the state index value of the self-device referred to by each agent in the distributed controller may be the state index value of the self-device confirmed to be received by the adjacent agent. To this end, each agent may be configured to inform the adjacent agent at the destination that the state index value has been received from the adjacent agent.

In the meantime, in the reference correction as described above, the measurement time of the state index value of the self-device and that of the state index value of the adjacent device, which are referred to in the distributed controller of each agent, may not coincide with each other. Accordingly, it is to be understood that the operational effect of conserving the average of the state index values of all agents in the system, through the reference correction, is achieved even in the case where time delays in signal communication between any given two agents are not symmetrical.

(C) Control Gain Correction

The convergence performance of the state index values of the respective agents under the environment where a finite delay time arises in signal communication between each pair of agents in the distributed control system can be improved by some degree, through intermittent transmission correction. Also, as the communication delay time between each pair of agents increases, oscillation occurs in the state index value because the calculated value of the distributed controller is oscillatory, and the state index values become less likely to converge. Thus, in order to reduce contribution of the distributed controller to the target value of the state index value, the distributed controller is multiplied by a gain $\gamma_i$ ($0<\gamma<1$), as indicated in Eq. (17) below, so that the convergence performance of the state index values can be further improved.

$$x_i[k+1] = x_i[k] + T_s \cdot \gamma_i \cdot u_i[k] \quad (17)$$

In connection with this point, oscillation of the calculated value of the distributed controller depends on the length of the communication delay time, as described above. Thus, in a general system in which the communication delay time randomly varies for each pair of agents, it is considered that oscillation of components (e.g., $(x_j[k_{aj}] - x_i[k_{bi}])$, $(x_i[k_{bi}] - x_j[k_{aj}])$ for the agents i, j) of the distributed controllers associated with agents becomes larger as the communication delay time between the agents is longer. Thus, the control gain determined based on the communication delay time may be used, so as to adjust contribution of the component of the distributed controller associated with each agent, to the state target value, according to the length of the communication delay time, so that the convergence performance of the state index value is further improved.

More specifically, the control input of the distributed controller $u_i$ may be modified as follows (in a similar manner to Eq. (6) above).

$$u_i[k] = \sum_{j \in N_i}^n G_{ij} \cdot a_{ij}(x_j[k_{aj}] - x_i[k_{bi}]) \quad (18)$$

where $G_{ij}$ is a control gain set for each difference corresponding to the control unit of the adjacent device connected to each of the control units, and may be given by the following equation.

$$G_{ij} = g(\Delta_{ij}, \Delta_{ji}) \quad (19)$$

In Eq. (19), $g(\Delta_{ij}, \Delta_{ji})$ may be a function between a first communication delay time $\Delta_{ij}$ in transmission of the state index value from the agent j to the agent i, and a second communication delay time $\Delta_{ji}$ in transmission of the state index value from the agent i to the agent j. The communication delay time $\Delta_{ij}$ and the communication delay time $\Delta_{ji}$ are generally time variables, as described above. Since oscillation of the component of the distributed controller generally increases as the communication delay time $\Delta_{ij}$ or the communication delay time $\Delta_{ji}$ is longer, "g" may be a function of which the magnitude decreases as the communication delay time $\Delta_{ij}$ or the communication delay time $\Delta_{ji}$ is longer, or a monotonically decreasing function. Also, when the communication delay times between the agents are not symmetrical, "g" may be determined, depending on the longer one of the communication delay times in both directions. In this case, "g" may be a function of $\max(\Delta_{ij}, \Delta_{ji})$. Further, as described above in connection with the reference correction, when the average of the state index values of all of the agents in the system is required to be conserved, contribution of the distributed controller to the state index value of the agent i needs to be equal to contribution of the distributed controller to the state index value of the agent j. Thus, the control gain may be set as follows.

$$G_{ij}=G_{ji} \qquad (20)$$

To satisfy the above requirements, the control gain $G_{ij}$ may be given by $$G_{ij}=\Gamma^{\max(\Delta_{ij},\Delta_{ji})} \qquad (21)$$

using a positive number $\Gamma$ that is smaller than 1, first communication delay time $\Delta_{ij}$, and second communication delay time $\Delta_{ji}$, for example. Alternatively, the control gain $G_{ij}$ may be given by $$G_{ij}=1/\{c\cdot\max(\Delta_{ij},\Delta_{ji})\} \qquad (22)$$

where "c" is a positive coefficient.

In the above system, the communication delay times ($\Delta_{ij}$, $\Delta_{ji}$) in both directions between each pair of agents may be obtained at each agent, by any method. In one example, each agent may record a clock time (measurement time) tm at which the state index value is measured, and send the state index value, along with the measurement time, to an agent as a destination, where a clock time (receiving time) tr at which the state index value is received may be recorded, and the communication delay time to the destination agent may be calculated by subtracting the measurement time from the receiving time (tr−tm). Here, the communication delay time thus calculated may be used for determining the control gain in the destination agent. Then, the communication delay time is transmitted, along with notification of receiving of the state index value, from the agent to which the state index value was transmitted, to each agent from which the state index value was transmitted, and the communication delay time may be used for determining the control gain in each agent.

(D) Communication Sequence

Figure 3:
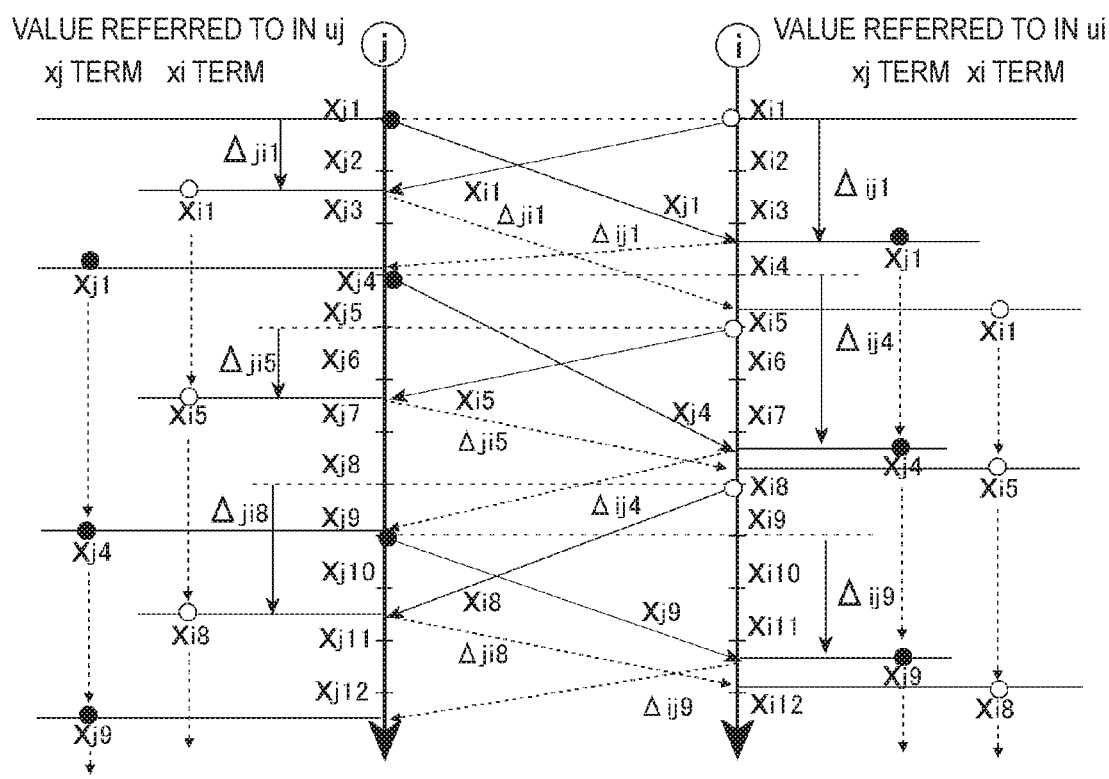
FIG. 3 is a view schematically showing the sequence (flow) of sending and receiving state index values $x_i$, $x_j$ and communication delay times $\Delta_{ij}$, $\Delta_{ji}$ between mutually adjacent agents i, j, and values referred to in $x_i$ term and $x_j$ term of the state index values in the respective control inputs of distributed controllers $u_i$, $u_j$, in the distributed control system as shown in FIG. 1A to FIG. 1D.
Figure 4:
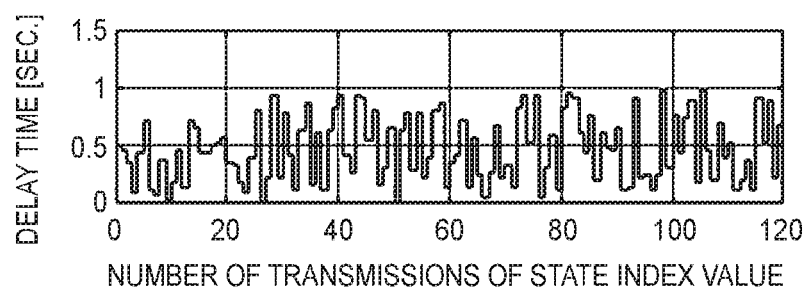
FIG. 4 shows an example of the communication delay time that randomly changes for each transmission, which is used in calculation simulation for calculating changes of the state index value of each agent with time in the case where the communication delay time is randomly changed, in the distributed control system shown in FIG. 1A to FIG. 1D.

FIG. 3 illustrates the sequence of measurement, communication, and reference of the state index values between any given two adjacent agents i, j in the system when the intermittent transmission correction, reference correction and control gain correction are applied to the system. In the example of FIG. 3, the length of time required to transmit a signal is schematically expressed for the purpose of explanation, and may be different from the actual length of time.

Referring to FIG. 3, initially, the state index values $x_{ik}$, $x_{jk}$ (k=1, 2, . . . ) are measured in time series, by the agents i, j, respectively. Then, the agents i, j respectively send the measured state index values $x_{ik}$, $x_{jk}$ to the agents j, i, along with their measurement times. When the transmitted state index values $x_{ik}$, $x_{jk}$ are received by the agents j, i, the receiving time is recorded in each agent, and the measurement time of the state index value $x_{ik}$, $x_{ij}$ is subtracted from the corresponding receiving time, so that the communication delay time $\Delta_{jik}$ is calculated in the agent j, while the communication delay time $\Delta_{ijk}$ is calculated in the agent i. Also, the state index value $x_{ik}$ received by the agent j is referred to as $x_i$ term (the first term of the difference) in a control input of the distributed controller $u_j$, and the state index value $x_{jk}$ received by the agent i is referred to as $x_j$ term (the first term of the difference of Eq. (18)) in the control input of the distributed controller $u_i$. Further, the agents j, i that receive the state index values $x_{ik}$, $x_{jk}$ send the receiving notifications back to the source agents i, j, along with the communication delay times $\Delta_{jik}$, $\Delta_{ijk}$, respectively, and the agent i, j, upon receipt of the receiving notification, refers to its own state index value $x_{ik}$, $x_{jk}$ previously transmitted and corresponding to the receiving notification, as a term (the second term of the difference of Eq. (18)) of the own state index value in the distributed controller. Then, the agent i, j sends the latest measured state index value $x_{ik}$, $x_{jk}$ (which may be a value measured by the time of receipt of the receiving notification or a value measured immediately after receipt of the receiving notification), to the agent j, i, and the above operation is repeated. As a result, in each agent, the state index value referred to in the distributed controller is the latest value received, for the state index value of the adjacent agent, and is the latest value transmitted, of which the receiving notification has reached the agent. Namely, until a new value is received, or until a new receiving notification is received, the latest value, out of the values that have been received, is used in the distributed controller.

As one example, when a state index value $x_{j4}$ measured at k=4 in the agent j is transmitted from the agent j and received by the agent i after a lapse of k=7, the state index value $x_{j4}$ is referred to as the $x_j$ term of the control input of the distributed controller $u_i$ from this point in time, in the agent i, and the communication delay time $\Delta_{ij4}$ as a difference between the measurement time and receiving time of the state index value $x_{j4}$ is calculated, and used for determining the control gain $G_{ij}$. Then, the state index value $x_{j4}$ and the communication delay time $\Delta_{ij4}$ are used until the next state index value is received from the agent j. Then, a notification on receiving of the state index value $x_{j4}$ is transmitted from the agent i back to the agent j, along with the communication delay time $\Delta_{ij4}$. When the notification is received by the agent j, the state index value $x_{j4}$ is referred to as the $x_j$ term of the control input of the distributed controller $u_j$ from this point in time, in the agent j, and the communication delay time $\Delta_{ij4}$ is used for determination of the control gain $G_{ji}$. Then, the latest state index value $x_{j9}$ in the agent j is transmitted to the agent i. In the agent j, the state index value $x_{j4}$ and the communication delay time $\Delta_{ij4}$ are used for computation of the distributed controller, until the notification on receiving of the state index value $x_{j9}$ is received.

(E) Calculation Simulation

In the system illustrated in FIG. 1A to FIG. 1D, the operational effects of the above reference correction and control gain correction are confirmed through calculation simulation (FIG. 5A, FIG. 5B, FIG. 6A, FIG. 6B). After the initial value was given to each agent, the state index value of each agent was calculated, using Eq. (17), according to the control protocol by applying intermittent transmission correction to transmission of the state index values between each pair of agents, applying reference correction to computation of the distributed controller, and setting the control gain of the distributed controller in computation of the target value of the state index value, as needed. The communication delay times of the state index values between each pair of agents in both directions were respectively given randomly, within a range of zero to five seconds. The distributed controller of each agent was computed according to Eq. (18) obtained by applying the control gain $G_{ij}$ to Eq. (16). The control gain $G_{ij}$ was computed according to Eq. (21). In the calculation simulations of FIGS. 5A, 5B, 6A, and 6B, the initial values of the state index values of the respective agents were randomly given, such that the average of these values became equal to 10, and the measurement (sampling) cycle of the state index value of each agent and the computation cycle were set to 1 second (1 step) (the measurement timing was assumed to coincide with the computation timing). Transmission of the state index values from each agent was set such that the next state index value was transmitted, after the agent received notification of receiving of the transmitted state index value, from an agent at a destination (after arrival of the transmitted state index value was checked) (intermittent transmission correction). The state index values referred to in the control input of the distributed controller $u_i$ of each agent were the latest state index value of the adjacent device received from the control unit of the adjacent device, and the latest state index value of the self-device received by the control unit of the adjacent device.

Figure 5A:
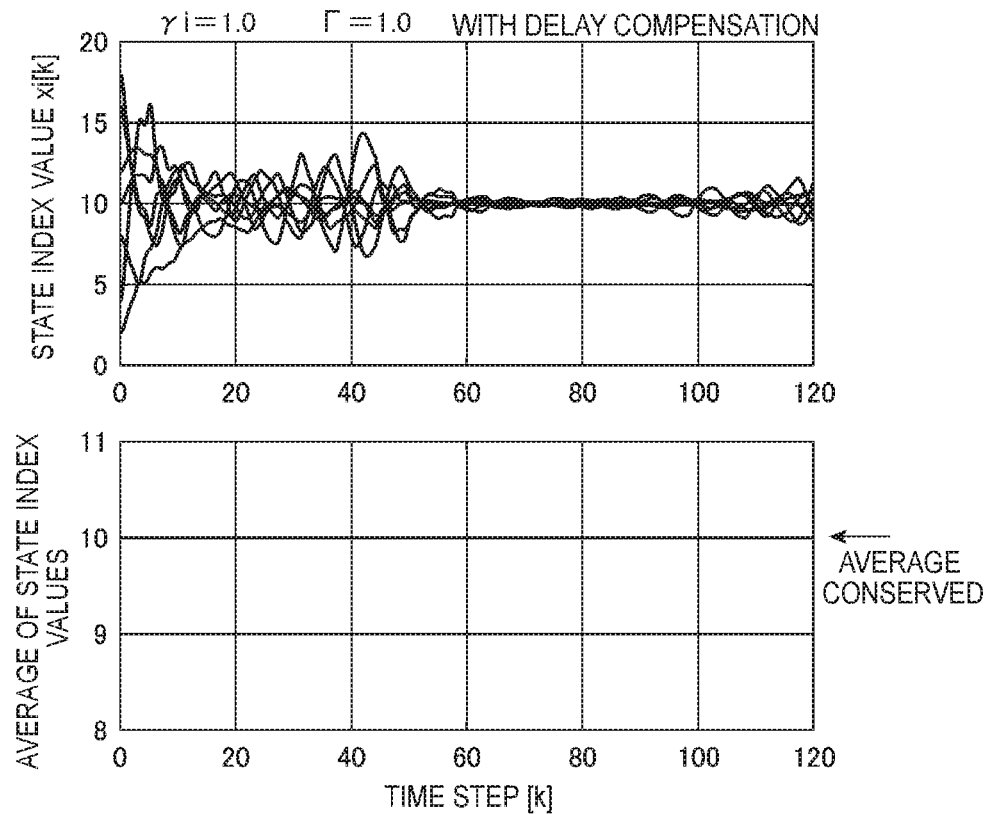
FIG. 5A shows the result of a calculation simulation of changes of the state index values of respective agents with time, which result is obtained according to a control protocol (reference correction) for compensating for delays in communication of the state index values between agents, where a control gain $\gamma_i$ of the distributed controller as a whole relative to the state target value is 1, and a constant coefficient $\Gamma$ that gives a control gain $G_{ij}$ determined for each pair of adjacent agents is 1, in the distributed control system shown in FIG. 1A to FIG. 1D.
Figure 5B:
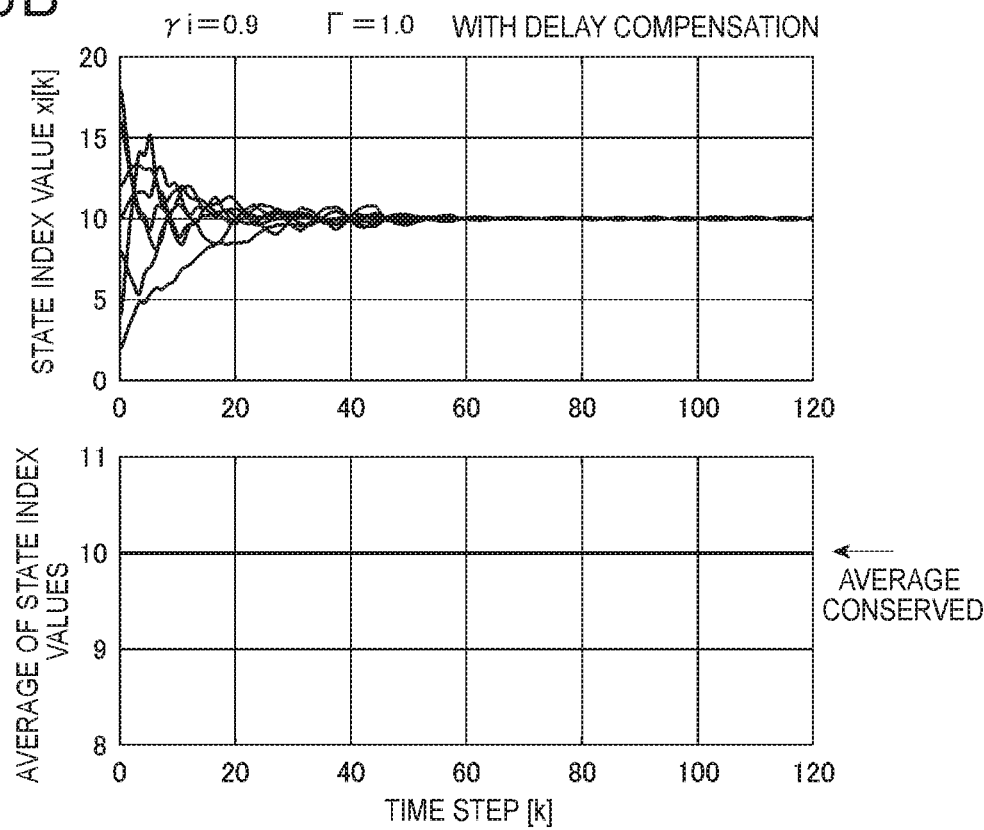
FIG. 5B shows the result of a calculation simulation of changes of the state index values of respective agents with time, which result is obtained according to a control protocol (reference correction) for compensating for delays in communication of the state index values between agents, where the control gain $\gamma_i$ of the distributed controller as a whole relative to the state target value of each agent is 0.9, and the constant coefficient $\Gamma$ that gives the control gain $G_{ij}$ determined for each pair of adjacent agents is 1, in the distributed control system shown in FIG. 1A to FIG. 1D.

Initially, FIG. 5A shown an example in which the intermittent correction and the reference correction were applied. In this example, $\gamma_i$ was set to 1.0, and $\Gamma$ was set to 1.0, so that the control gain correction was not applied. As is understood from FIG. 5A, the state index values of the respective agents changed in a converging direction, but a convergence condition (a difference between the state index values of each pair of agents is held within ±0.01%) was not achieved within a test period (120 sec.: 120 steps). However, as indicated in the lower section of FIG. 5A, it was confirmed that the average of the state index values of the agents was conserved, during computation, since the reference correction was applied. FIG. 5B and FIG. 6A show examples in which the intermittent transmission correction and the reference correction were applied, and further, the gain $\gamma_i$ for reducing contribution of the distributed controller as a whole was set to 0.9, and 0.5, respectively. Referring to these figures, since the reference correction was applied in either case, it was confirmed that the average of the state index values of the agents was conserved, during computation, and the state index values of the agents changed so as to converge more quickly, as compared with the case of FIG. 5A. While the convergence condition was not achieved within the test period (120 sec.) in the case of FIG. 5B, the convergence condition was achieved upon a lapse of about 100 sec. in the case of FIG. 6A.

On the other hand, in the example of FIG. 6B, the gain $\gamma_i$ for reducing contribution of the distributed controller as a whole was returned to 1.0, and $\Gamma$ was set to 0.9, so that the control gain correction was applied so as to apply the control gain for reducing contribution of a component associated with the corresponding agent in the distributed controller, according to the communication delay time between each pair of agents. In this case, as is understood from FIG. 6B, the average of the state index values of the agents was conserved, and the state index values of the respective agents changed so as to converge more quickly, as compared with the cases of FIG. 5B and FIG. 6A. In the example of FIG. 6B, the convergence condition was achieved upon a lapse of about 50 sec. As shown in FIG. 6B, the state index values of the agents converged earlier when the control gain was applied according to the communication delay time for each pair of agents, as compared with the case where the gain of the distributed controller as a whole was adjusted. This may be because the contribution of the component having a long communication delay time is made relatively small, while the contribution of the component having a short communication delay time is made relatively large, so that the state index value of the agent associated with the component having a short communication delay time can be relatively quickly made close to the consensus value.

It was confirmed, from the above results of the calculation simulation that the average of the state index values of the respective agents is conserved, according to the control protocol to which the reference correction is applied, and the state index values of the agents are converged to the consensus value as scheduled. Also, it was demonstrated that the convergence of the state index values of the agents is speeded up, by using correction to apply the control gain determined according to the communication delay time for each pair of agents as described above. It is to be understood that the above operational effects are also accomplished even when delays in signal transmission between agents are not symmetrical.

Also, it is to be understood that the above control gain correction is not limitedly applied to the illustrated average consensus control, but may also be applied to other control types, such as consensus control, coating control, and distributed optimizing control, when the communication delay time arises, and an effect of compensating for deterioration of the convergence performance of the state index values of the agents due to the communication delay time can be obtained.

Further, while the above consensus control is advantageously applied to the case of the average consensus control where the consensus value is the average of the initial values of the state index values of all agents, the consensus control may be leader-follower consensus control under which the consensus value is a state index value of a given agent in the system, or consensus control under which the consensus value is the geometric average value, the maximum value, or the minimum value of the initial values of the state index values of all agents.

While the above description is concerned with the embodiments of the disclosure, it is apparent that those skilled in the art can easily make a variety of corrections and changes, and that this disclosure is not limited to the illustrated embodiments, but may be applied to various devices without departing from the principle of the disclosure.

What is claimed is:

1. A distributed control system comprising:
   a plurality of control units that control respective states of a plurality of devices; and
   a communication network including a communication line that connects the control units, wherein
   a state index value representing a selected state is measured in each of the devices,
   the state index value is transmitted, via the communication line, from corresponding one of the control units to a control unit of an adjacent device as one of the devices,
   a state target value is determined according to consensus control of a multi-agent system, referring to the state index value of a self-device as one of the devices, and the state index value of the adjacent device,
   a control unit of each of the devices is configured to control a state of the self-device, such that the state index value of the self-device coincides with the state target value determined,
   the control unit of each of the devices is configured to determine the state target value, using a current state index value of the self-device, a sampling period and a control input of the control unit, and a difference between a latest state index value of the adjacent device received from the control unit of the adjacent device, and a latest state index value of the self-device received by the control unit of the adjacent device, the self-device being a device of which the state is controlled by the control unit of each of the devices, the adjacent device being a device of which the state is controlled by a control unit that is directly connected to the control unit of each of the devices, via the communication line, the control input of the control unit being a sum of differences between the state index values of a plurality of adjacent devices and the state index value of the self-device, contribution of the difference to the state target value is adjusted by a control gain determined based on at least one of a communication delay time of the state index value of the adjacent device when transmitted from the control unit of the adjacent device to the control unit of each of the devices, and a communication delay time of the state index value of the self-device when transmitted from the control unit of each of the devices to the control unit of the adjacent device, and the control gain is set for each of the differences corresponding to the control unit of the adjacent device connected to the control unit of each of the devices, wherein the control gain is given by $G_{ij}=\Gamma^{max(\Delta ij,\Delta ji)}$, where $G_{ij}$ is the control gain, $\Gamma$ is a positive number smaller than 1, $\Delta_{ij}$ is the communication delay time of the state index value of the adjacent device when transmitted from the control unit of the adjacent device to the control unit of each of the devices, and $\Delta_{ji}$ is the communication delay time of the state index value of the self-device when transmitted from the control unit of each of the devices to the control unit of the adjacent device.

2. The distributed control system according to claim 1, wherein the consensus control is average consensus control.

3. The distributed control system according to claim 1, wherein the control unit of each of the devices is configured to send the state index value of the self-device to the control unit of the adjacent device, and sends the latest state index value of the self-device, after the state index value of the self-device transmitted reaches the control unit of the adjacent device.

4. The distributed control system according to claim 1, wherein, when the control unit of each of the devices receives the state index value of the adjacent device transmitted from the control unit of the adjacent device, the control unit of each of the devices is configured to notify the control unit of the adjacent device as a source of transmission of the state index value, of receiving of the state index value of the adjacent device.

5. The distributed control system according to claim 4, wherein the latest state index value of the self-device received by the control unit of the adjacent device for use in the difference is the latest state index value of the self-device that receives a notification of receiving of the state index value of the self-device, from the control unit of the adjacent device.

6. The distributed control system according to claim 1, wherein the control gain is determined, based on a longer one of the communication delay time of the state index value of the adjacent device when transmitted from the control unit of the adjacent device to the control unit of each of the devices, and the communication delay time of the state index value of the self-device when transmitted from the control unit of each of the devices to the control unit of the adjacent device.

7. The distributed control system according to claim 1, wherein the control gain is reduced when the communication delay time based on which the control gain is determined is long in comparison with when the communication delay time based on which the control gain is determined is short.

8. The distributed control system according to claim 1, wherein the control input is determined, using a measurement time of the state index value of the adjacent device which is transmitted from the control unit of the adjacent device and received by a control unit of the self-device, and a measurement time of the state index value of the self-device which is transmitted from the control unit of the self-device and received by the control unit of the adjacent device.

9. The distributed control system according to claim 1, wherein the sampling period and the control input are modified by using the control gain.

10. The distributed control system according to claim 1, wherein the control gain is given by $G_{ij}=1/\{c\cdot max(\Delta_{ij}, \Delta_{ji})\}$, where $G_{ij}$ is the control gain, c is a positive coefficient, $\Delta_{ij}$ is the communication delay time of the state index value of the adjacent device when transmitted from the control unit of the adjacent device to the control unit of each of the devices, and $\Delta_{ji}$ is the communication delay time of the state index value of the self-device when transmitted from the control unit of each of the devices to the control unit of the adjacent device.

11. The distributed control system according to claim 1, wherein there are a plurality of communication lines, and the communication network comprises the communication lines.

* * * * *